United States Patent
Fujii et al.

(10) Patent No.: US 9,213,753 B2
(45) Date of Patent: Dec. 15, 2015

(54) COMPUTER SYSTEM

(71) Applicant: Hitachi, Ltd., Tokyo (JP)

(72) Inventors: Hiroko Fujii, Tokyo (JP); Hideo Ohata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/374,286

(22) PCT Filed: Nov. 18, 2013

(86) PCT No.: PCT/JP2013/080999
§ 371 (c)(1),
(2) Date: Jul. 24, 2014

(87) PCT Pub. No.: WO2015/072026
PCT Pub. Date: May 21, 2015

(65) Prior Publication Data
US 2015/0142738 A1    May 21, 2015

(51) Int. Cl.
*G06F 17/30* (2006.01)
*G06F 3/06* (2006.01)

(52) U.S. Cl.
CPC ........ *G06F 17/30578* (2013.01); *G06F 3/0647* (2013.01); *G06F 17/30312* (2013.01)

(58) Field of Classification Search
CPC ................... G06F 17/30578; G06F 17/30312; G06F 3/0647
USPC ........................................................ 707/613
See application file for complete search history.

(56) References Cited

U.S. PATENT DOCUMENTS

| | | | | |
|---|---|---|---|---|
| 6,643,667 | B1* | 11/2003 | Arai et al. | 707/640 |
| 7,219,103 | B2* | 5/2007 | Vasudevan et al. | 707/613 |
| 7,725,776 | B2* | 5/2010 | Mikami | 714/46 |
| 8,271,991 | B2* | 9/2012 | Tanaka et al. | 718/105 |
| 8,341,115 | B1* | 12/2012 | Natanzon et al. | 707/613 |
| 8,407,182 | B1* | 3/2013 | Rajaa et al. | 707/610 |
| 2004/0267829 | A1* | 12/2004 | Hirakawa et al. | 707/200 |
| 2005/0154849 | A1* | 7/2005 | Watanabe | 711/165 |
| 2005/0204105 | A1 | 9/2005 | Kawamura et al. | |
| 2005/0240634 | A1* | 10/2005 | Iwamura et al. | 707/200 |
| 2006/0069865 | A1* | 3/2006 | Kawamura et al. | 711/114 |
| 2006/0085609 | A1* | 4/2006 | Ninose et al. | 711/162 |
| 2006/0085610 | A1* | 4/2006 | Iwamura et al. | 711/162 |
| 2006/0101217 | A1* | 5/2006 | Maki et al. | 711/162 |

(Continued)

FOREIGN PATENT DOCUMENTS

| | | | |
|---|---|---|---|
| JP | 2005-258850 A | 9/2005 | |
| JP | 2006-293947 A | 10/2006 | |
| JP | 2007-188267 A | 7/2007 | |

*Primary Examiner* — Phuong Thao Cao
(74) *Attorney, Agent, or Firm* — Volpe and Koenig, P.C.

(57) ABSTRACT

The management system includes pair management information for managing pair groups and resource management information for managing resources allocated to the pair groups. The management system monitors data transfer latencies in asynchronous remote copy in the pair groups. In a case where data transfer latencies in a first pair group of the pair groups reach a threshold, the management system selects a first asynchronous remote copy pair from the first pair group with reference to the pair management information. The management system selects a second pair group allocated resources different from resources allocated to the first pair group as a candidate migration destination of the first asynchronous remote copy pair with reference to the resource management information.

14 Claims, 15 Drawing Sheets

(56) References Cited

U.S. PATENT DOCUMENTS

| | | | |
|---|---|---|---|
| 2006/0236048 A1* | 10/2006 | Deguchi et al. | 711/162 |
| 2006/0236056 A1* | 10/2006 | Nagata | 711/165 |
| 2007/0050573 A1* | 3/2007 | Arakawa et al. | 711/162 |
| 2007/0101082 A1* | 5/2007 | Sugiura et al. | 711/165 |
| 2007/0162716 A1* | 7/2007 | Yagisawa et al. | 711/162 |
| 2007/0168404 A1* | 7/2007 | Nakamura et al. | 707/204 |
| 2007/0220322 A1* | 9/2007 | Mikami | 714/13 |
| 2007/0244936 A1* | 10/2007 | Schlomer et al. | 707/204 |
| 2007/0245110 A1* | 10/2007 | Shibayama et al. | 711/165 |
| 2007/0254922 A1* | 11/2007 | Hiraiwa et al. | 514/338 |
| 2007/0255914 A1* | 11/2007 | Maki et al. | 711/162 |
| 2008/0028172 A1* | 1/2008 | Takahashi et al. | 711/162 |
| 2008/0104443 A1* | 5/2008 | Akutsu et al. | 714/6 |
| 2008/0140966 A1* | 6/2008 | Deguchi et al. | 711/162 |
| 2008/0183994 A1* | 7/2008 | Maki et al. | 711/162 |
| 2008/0301385 A1* | 12/2008 | Nagata et al. | 711/162 |
| 2009/0119467 A1* | 5/2009 | Emaru et al. | 711/162 |
| 2009/0313428 A1* | 12/2009 | De Jong | 711/114 |
| 2010/0011179 A1* | 1/2010 | Sano et al. | 711/162 |
| 2010/0049823 A1* | 2/2010 | Saigo et al. | 709/216 |
| 2010/0058012 A1* | 3/2010 | Okada et al. | 711/162 |
| 2010/0122051 A1* | 5/2010 | Maki et al. | 711/162 |
| 2010/0138621 A1* | 6/2010 | Arifin | 711/162 |
| 2010/0153666 A1* | 6/2010 | Emaru et al. | 711/162 |
| 2010/0191926 A1* | 7/2010 | Hara et al. | 711/162 |
| 2010/0217932 A1* | 8/2010 | Yamada et al. | 711/114 |
| 2010/0318756 A1* | 12/2010 | Yoshinari et al. | 711/162 |
| 2011/0082988 A1* | 4/2011 | Kono et al. | 711/161 |
| 2011/0167235 A1* | 7/2011 | Inoue et al. | 711/162 |
| 2011/0246740 A1* | 10/2011 | Yata et al. | 711/165 |
| 2011/0264878 A1* | 10/2011 | Blea et al. | 711/162 |
| 2012/0072687 A1* | 3/2012 | Hiraiwa et al. | 711/162 |
| 2012/0311602 A1* | 12/2012 | Deguchi et al. | 718/105 |
| 2012/0311603 A1* | 12/2012 | Kudo et al. | 718/105 |
| 2013/0080723 A1* | 3/2013 | Sawa et al. | 711/162 |
| 2013/0138903 A1* | 5/2013 | Matsui et al. | 711/162 |
| 2013/0332608 A1* | 12/2013 | Shiga et al. | 709/226 |
| 2014/0068210 A1* | 3/2014 | Deguchi | 711/162 |

\* cited by examiner

Fig. 6

PROPOSED MIGRATION LIST IMAGE 401

| # | COPY GROUP | MIGRATION SOURCE | | | MIGRATION DESTINATION | | % of Threshold (CURRENT VALUE) | % of Threshold (ESTIMATED VALUE AFTER MIGRATION) | CHECK |
|---|---|---|---|---|---|---|---|---|---|
| | | PAIR GROUP ID | APPARATUS ID | VOL ID | PAIR GROUP ID | APPARATUS ID | | | |
| 1 | Group A | PAIR#1 | MCU#1 | PVOL#12 | PAIR#2 | MCU#2 | 133% | 100% | ☑ |
| | | | RCU#1 | SVOL#12 | | RCU#2 | | | |
| 2 | .. | .. | .. | .. | .. | .. | .. | .. | .. |

MIGRATE

Fig. 7

DATA TRANSFER LATENCY THRESHOLD MANAGEMENT TABLE FOR COPY GROUPS — 501

| COPY GROUP ID (502) | NAME (503) | DATA TRANSFER LATENCY THRESHOLD (504) |
|---|---|---|
| CTG1 | GROUPA | 3TS# |
| CTG2 | GROUPB | 4TS# |
| : | : | : |

Fig. 8

PRIMARY VOLUME MANAGEMENT TABLE — 601

| APPARATUS ID (602) | VOLUME ID (603) | CAPACITY (604) |
|---|---|---|
| MCU#1 | PVOL#11 | 20 GB |
| MCU#1 | PVOL#12 | 10 GB |
| MCU#1 | PVOL#13 | 15 GB |
| MCU#1 | PVOL#15 | 5 GB |
| MCU#1 | PVOL#16 | 10 GB |
| : | : | : |
| MCU#2 | PVOL#21 | 10 GB |
| MCU#2 | PVOL#22 | 15 GB |
| MCU#2 | PVOL#25 | 10 GB |
| MCU#2 | PVOL#26 | 5 GB |
| : | : | : |

Fig. 9

PAIR GROUP MANAGEMENT TABLE (701)

| COPY GROUP ID (702) | PAIR GROUP ID (703) | MAIN STORAGE APPARATUS ID (704) | PRIMARY VOLUME ID (705) | REMOTE STORAGE APPARATUS ID (706) | SECONDARY VOLUME ID (707) |
|---|---|---|---|---|---|
| CTG1 | PAIR#1 | MCU#1 | PVOL#11 | RCU#1 | SVOL#11 |
| CTG1 | PAIR#1 | MCU#1 | PVOL#12 | RCU#1 | SVOL#12 |
| CTG1 | PAIR#1 | MCU#1 | PVOL#13 | RCU#1 | SVOL#13 |
| CTG1 | PAIR#2 | MCU#1 | PVOL#15 | RCU#1 | SVOL#15 |
| CTG1 | PAIR#2 | MCU#1 | PVOL#16 | RCU#1 | SVOL#16 |
| CTG2 | PAIR#3 | MCU#2 | PVOL#21 | RCU#2 | SVOL#21 |
| CTG2 | PAIR#3 | MCU#2 | PVOL#22 | RCU#2 | SVOL#22 |
| CTG2 | PAIR#4 | MCU#2 | PVOL#25 | RCU#2 | SVOL#25 |
| CTG2 | PAIR#4 | MCU#2 | PVOL#26 | RCU#2 | SVOL#26 |
| : | : | : | : | : | : |

Fig. 10

PAIR GROUP-RELATED RESOURCE MANAGEMENT TABLE (801)

| PAIR GROUP ID (802) | MAIN STORAGE APPARATUS ID (803) | MAIN STORAGE APPARATUS PORT ID (804) | MAIN STORAGE APPARATUS PROCESSOR ID (805) | REMOTE STORAGE APPARATUS ID (806) | REMOTE STORAGE APPARATUS PORT ID (807) | REMOTE STORAGE APPARATUS PROCESSOR ID (808) |
|---|---|---|---|---|---|---|
| PAIR#1 | MCU#1 | PORT11, PORT12 | MP11 | RCU#1 | PORT13, PORT14 | MP12 |
| PAIR#2 | MCU#2 | PORT21, PORT22 | MP21 | RCU#2 | PORT23, PORT24 | MP22 |
| PAIR#3 | MCU#1 | PORT11, PORT15 | MP15 | RCU#1 | PORT14, PORT16 | MP16 |
| PAIR#4 | MCU#2 | PORT25 | MP25 | RCU#2 | PORT26 | MP26 |
| : | : | : | : | : | : | : |

Fig. 11

| \_901 WRITE DATA AMOUNT MANAGEMENT TABLE | | | |
|---|---|---|---|
| APPARATUS ID | PRIMARY VOLUME ID | TIMESTAMP | WRITE DATA AMOUNT |
| MCU#1 | PVOL#11 | TS#199 | 20 MB |
| MCU#1 | PVOL#11 | TS#202 | 25 MB |
| MCU#1 | PVOL#12 | TS#203 | 15 MB |
| MCU#1 | PVOL#12 | TS#205 | 25 MB |
| MCU#1 | PVOL#13 | TS#201 | 20 MB |
| MCU#1 | PVOL#13 | TS#202 | 20 MB |
| MCU#1 | PVOL#13 | TS#204 | 30 MB |
| MCU#1 | PVOL#13 | TS#207 | 5 MB |
| MCU#1 | PVOL#15 | TS#197 | 10MB |
| MCU#1 | PVOL#15 | TS#191 | 5MB |
| MCU#1 | PVOL#16 | TS#210 | 10MB |
| MCU#2 | PVOL#21 | TS#190 | 10 MB |
| MCU#2 | PVOL#21 | TS#201 | 10 MB |
| MCU#2 | PVOL#22 | TS#202 | 10 MB |
| MCU#2 | PVOL#22 | TS#205 | 20 MB |
| MCU#2 | PVOL#25 | TS#203 | 15MB |
| MCU#2 | PVOL#26 | TS#195 | 10MB |
| ⋮ | ⋮ | ⋮ | ⋮ |

*Fig. 12*

| | | ⌐ 951 |
|---|---|---|
| DATA TRANSFER CAPABILITY MANAGEMENT TABLE FOR PORTS | | |
| ⌐ 952 | ⌐ 953 | ⌐ 954 |
| APPARATUS ID | PORT ID | DATA TRANSFER CAPABILITY |
| MCU#1 | PORT#11 | 25 MB/s |
| MCU#1 | PORT#12 | 30 MB/s |
| RCU#1 | PORT#13 | 25 MB/s |
| RCU#1 | PORT#14 | 20 MB/s |
| MCU#2 | PORT#21 | 50 MB/s |
| MCU#2 | PORT#22 | 60 MB/s |
| RCU#2 | PORT#23 | 40 MB/s |
| RCU#2 | PORT#24 | 50 MB/s |
| MCU#1 | PORT#15 | 70 MB/s |
| RCU#1 | PORT#16 | 80 MB/s |
| MCU#2 | PORT#25 | 120 MB/s |
| RCU#2 | PORT#26 | 80 MB/s |
| : | : | : |

Fig. 13

DATA TRANSFER CAPABILITY MANAGEMENT TABLE FOR PROCESSORS — 961

| APPARATUS ID (962) | PROCESSOR ID (963) | DATA TRANSFER CAPABILITY (964) |
|---|---|---|
| MCU#1 | MP#11 | 50 MB/s |
| RCU#1 | MP#12 | 50 MB/s |
| MCU#2 | MP#21 | 100 MB/s |
| RCU#2 | MP#22 | 100 MB/s |
| MCU#1 | MP#15 | 50 MB/s |
| RCU#1 | MP#16 | 100 MB/s |
| MCU#2 | MP#25 | 130 MB/s |
| RCU#2 | MP#26 | 70 MB/s |
| : | : | : |

Fig. 14

DATA TRANSFER LATENCY MANAGEMENT TABLE FOR PAIR GROUPS — 971

| PAIR GROUP ID (972) | DATA TRANSFER LATENCY (973) |
|---|---|
| PAIR#1 | 4TS# |
| PAIR#2 | 1TS# |
| : | : |

Fig. 15

DATA TRANSFER LATENCY MANAGEMENT TABLE FOR COPY GROUPS — 981

| COPY GROUP ID (982) | DATA TRANSFER LATENCY (983) |
|---|---|
| CTG1 | 4TS# |
| CTG2 | 2TS# |
| : | : |

COMPUTER SYSTEM

BACKGROUND OF THE INVENTION

This invention relates to management of asynchronous remote copy.

The background of this invention includes Patent literature 1. In the information storage system disclosed in Patent literature 1, the following processing is performed: During an asynchronous remote copy process for a plurality of asynchronous remote copy pairs, a copy of data in a migration source primary storage area is stored in a migration destination primary storage area, and the copy of data in the migration source primary storage area is also stored in a migration destination secondary storage area through a migration destination primary storage area or a migration source secondary storage area. Then, for an asynchronous remote copy pair established between the migration destination primary storage area and the migration destination secondary storage area together with the above-described asynchronous remote copy pairs, the asynchronous remote copy process is executed in such a method that a copy of writing data is stored in a plurality of secondary storage areas in accordance with the write request sequence issued by a computer.

Patent Literature 1: JP 2006-293947 A

SUMMARY

Among a plurality of asynchronous remote copy pairs, if a specific primary volume receives host write requests exceeding the data transfer capability for transferring copy data from the primary volume to the secondary volume, data transfer from the primary volume to the secondary volume might be delayed. Accordingly, for asynchronous remote copy in the plurality of asynchronous remote copy pairs, demanded is a technique to manage the plurality of asynchronous remote copy pairs in view of data transfer delay.

An aspect of this invention is a computer system including an information storage system including one or more main storage apparatuses and one or more remote storage apparatuses, and a management system for managing the information storage system. The information storage system includes a plurality of asynchronous remote copy pairs. The plurality of asynchronous remote copy pairs each consists of a primary volume provided by the one or more main storage apparatuses and a secondary volume provided by the one or more remote storage apparatuses. The plurality of asynchronous remote copy pairs are divided into a plurality of pair groups each including one or more asynchronous remote copy pairs. The management system includes pair management information for managing relations between the plurality of pair groups and one or more asynchronous remote copy pairs included in the plurality of pair groups, and resource management information for managing resources allocated to the plurality of pair groups to be used to transfer copy data in asynchronous remote copy. The management system monitors data transfer latencies in asynchronous remote copy in the plurality of pair groups. In a case where data transfer latencies in a first pair group of the plurality of pair groups reach a threshold, the management system selects a first asynchronous remote copy pair from the first pair group with reference to the pair management information. The management system selects a second pair group allocated resources different from resources allocated to the first pair group as a candidate migration destination of the first asynchronous remote copy pair with reference to the resource management information.

According to an aspect of this invention, for asynchronous remote copy in a plurality of asynchronous remote copy pairs, the plurality of asynchronous remote copy pairs can be managed in view of data transfer delay.

BRIEF DESCRIPTION OP THE DRAWINGS

Figure 3:
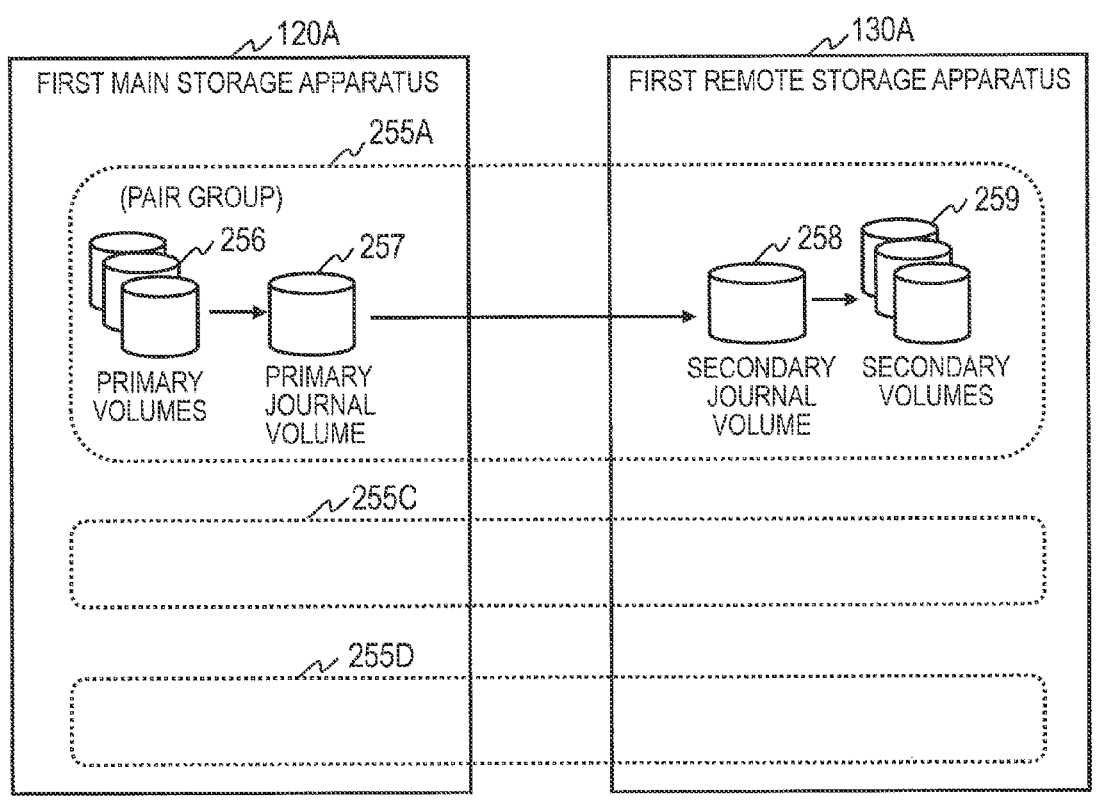
Figures 4, 5:
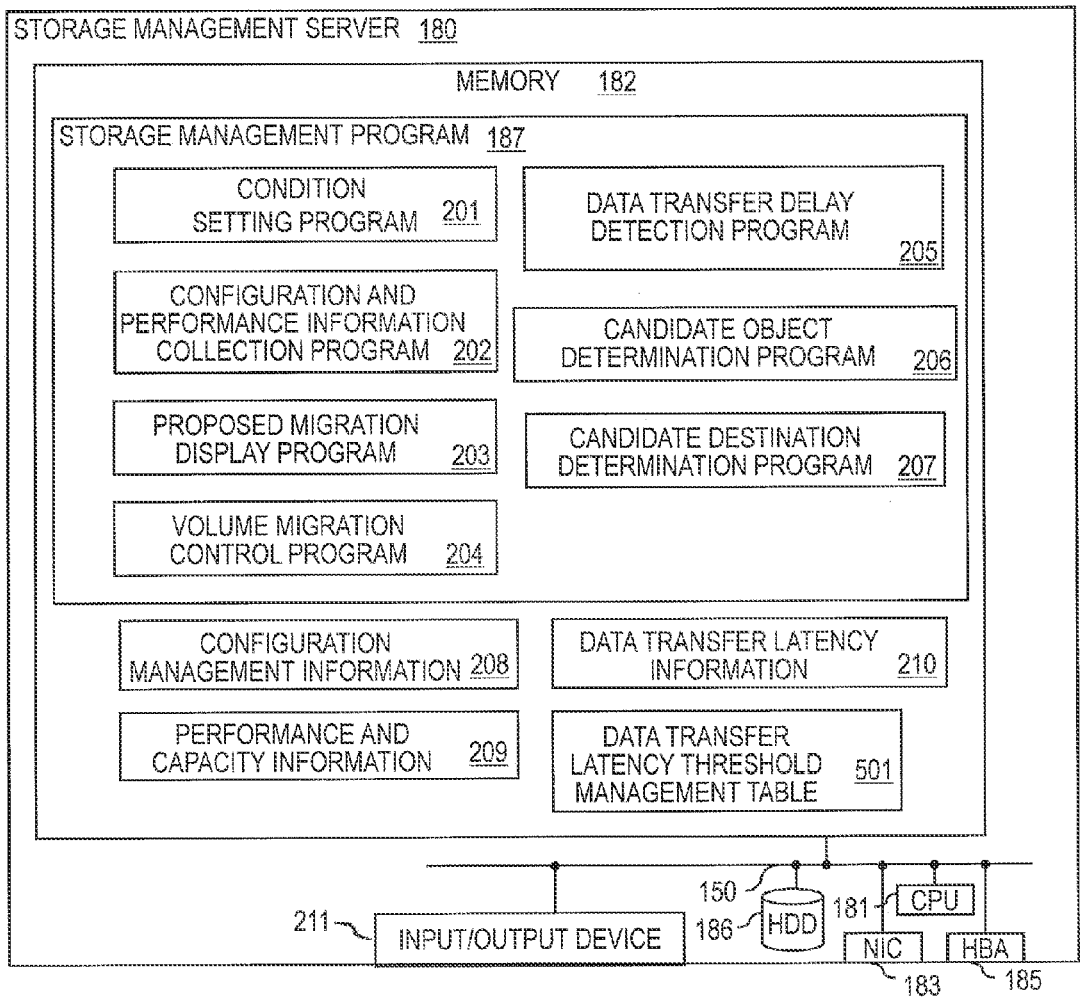
Figure 16:
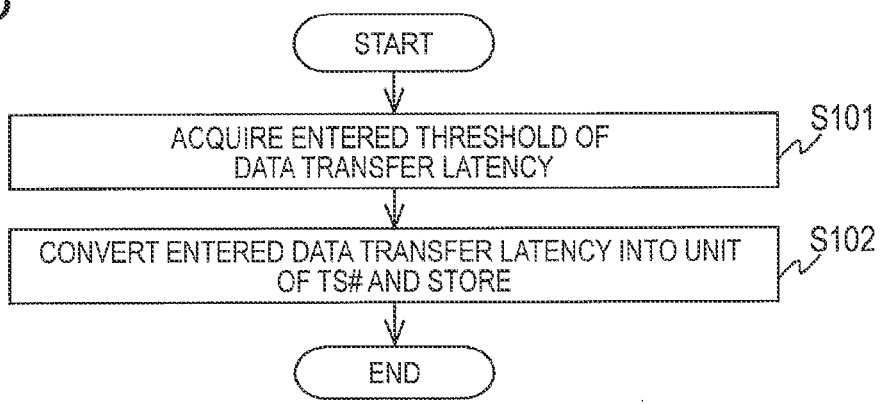
Figure 17:
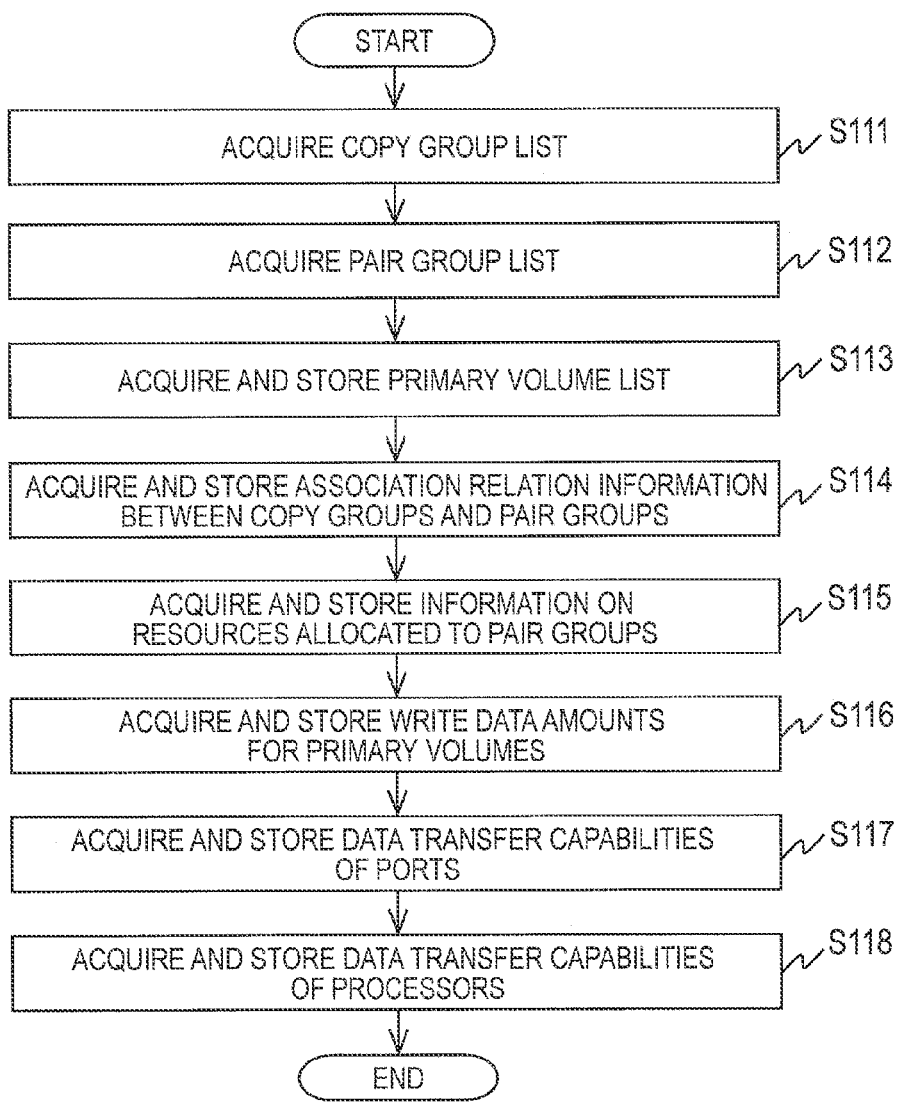
Figure 18:
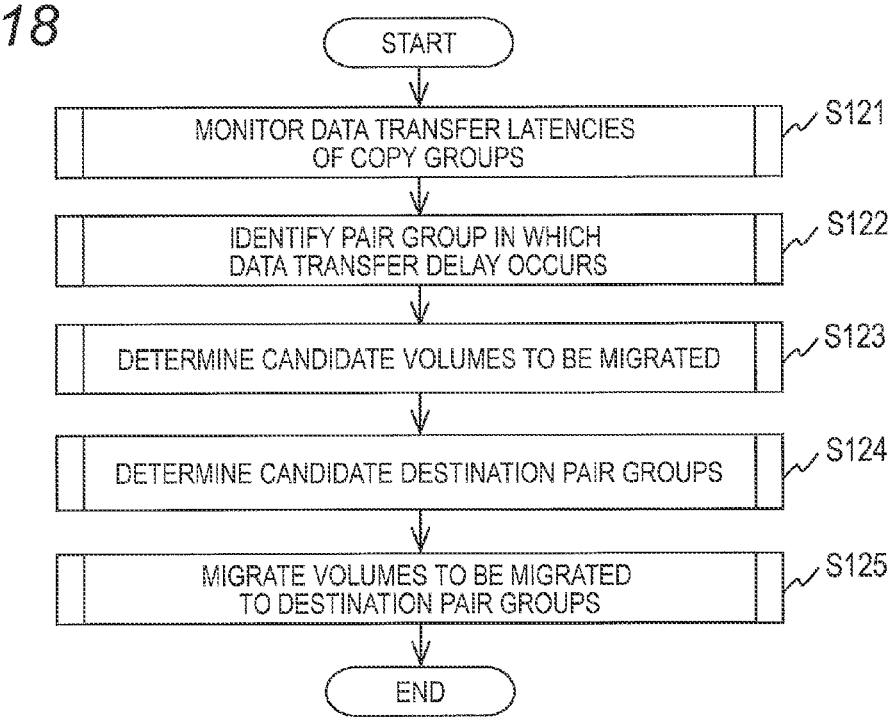
Figure 19:
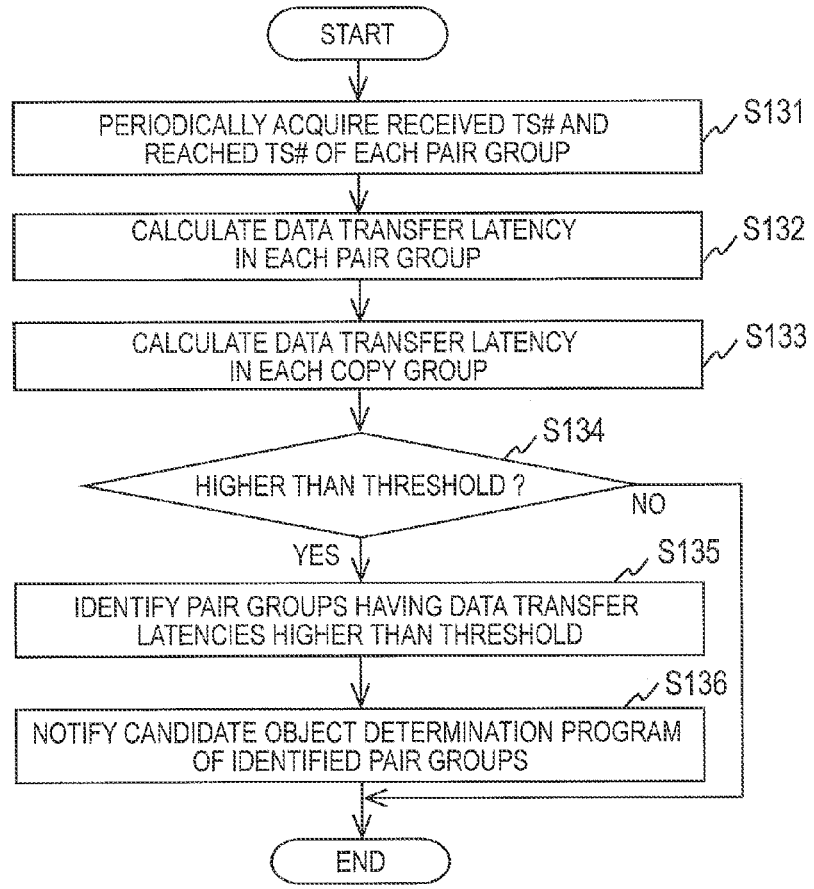
Figure 20:
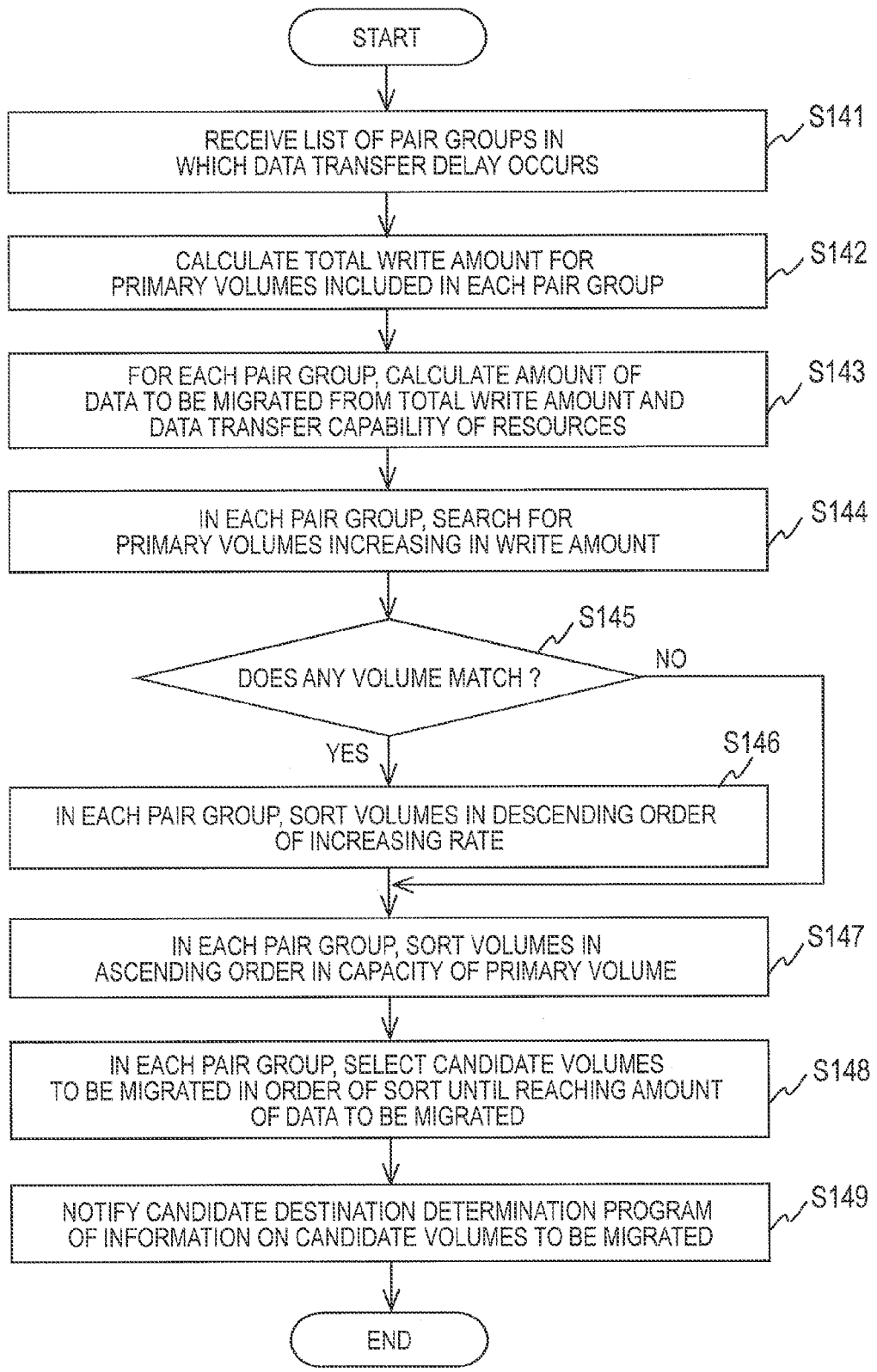
Figure 21:
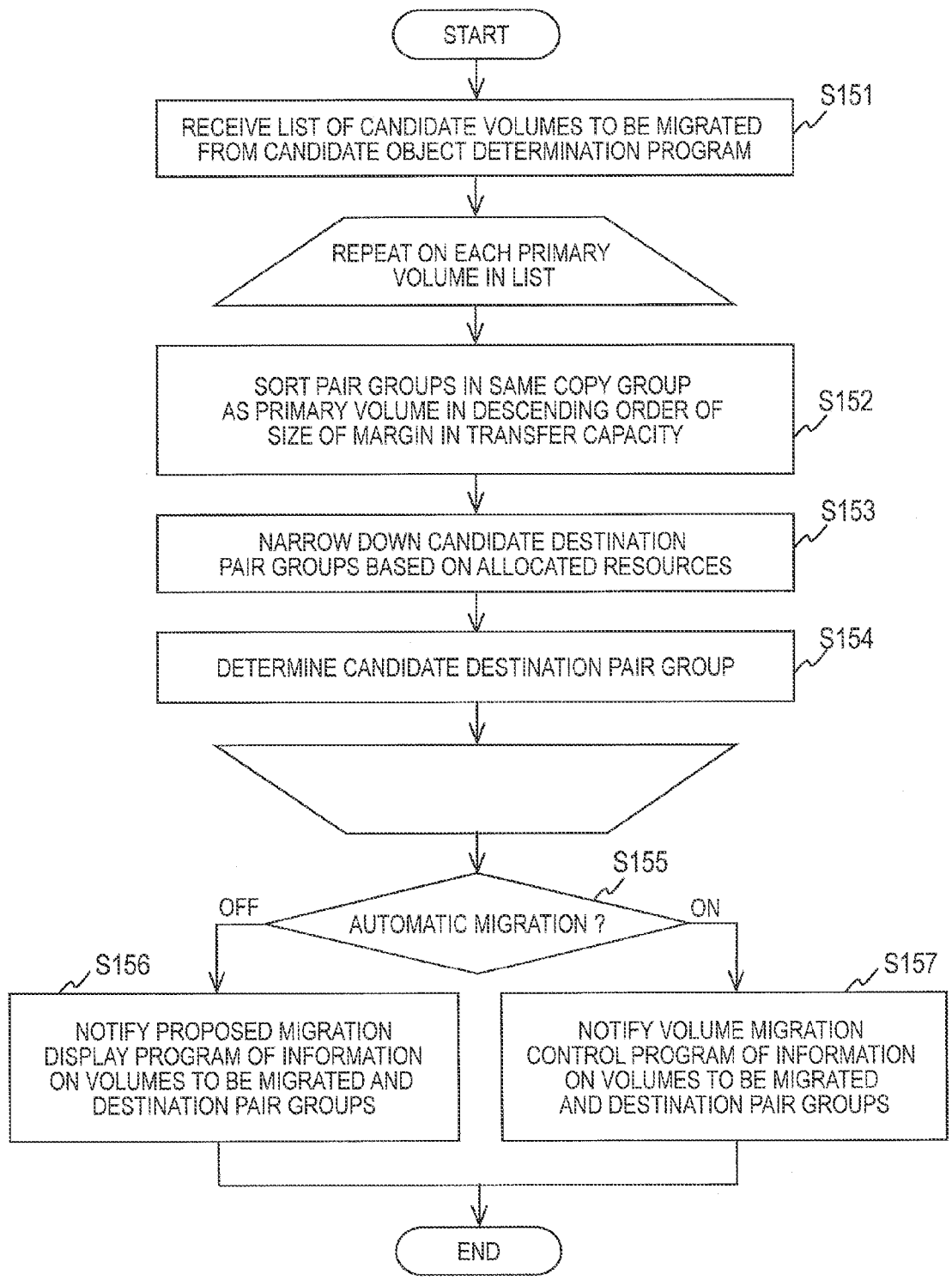
Figure 22:
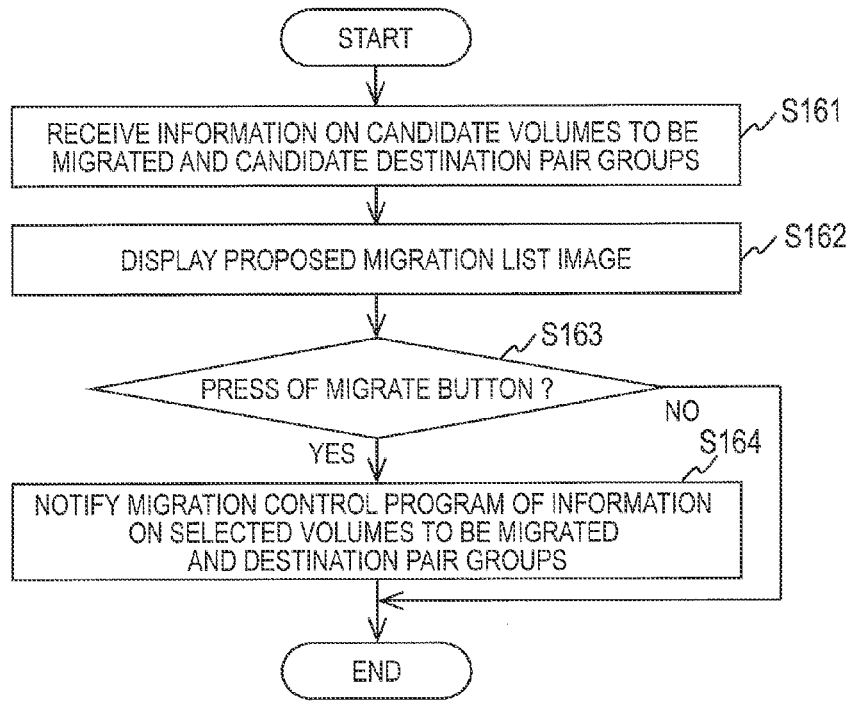
Figure 23:
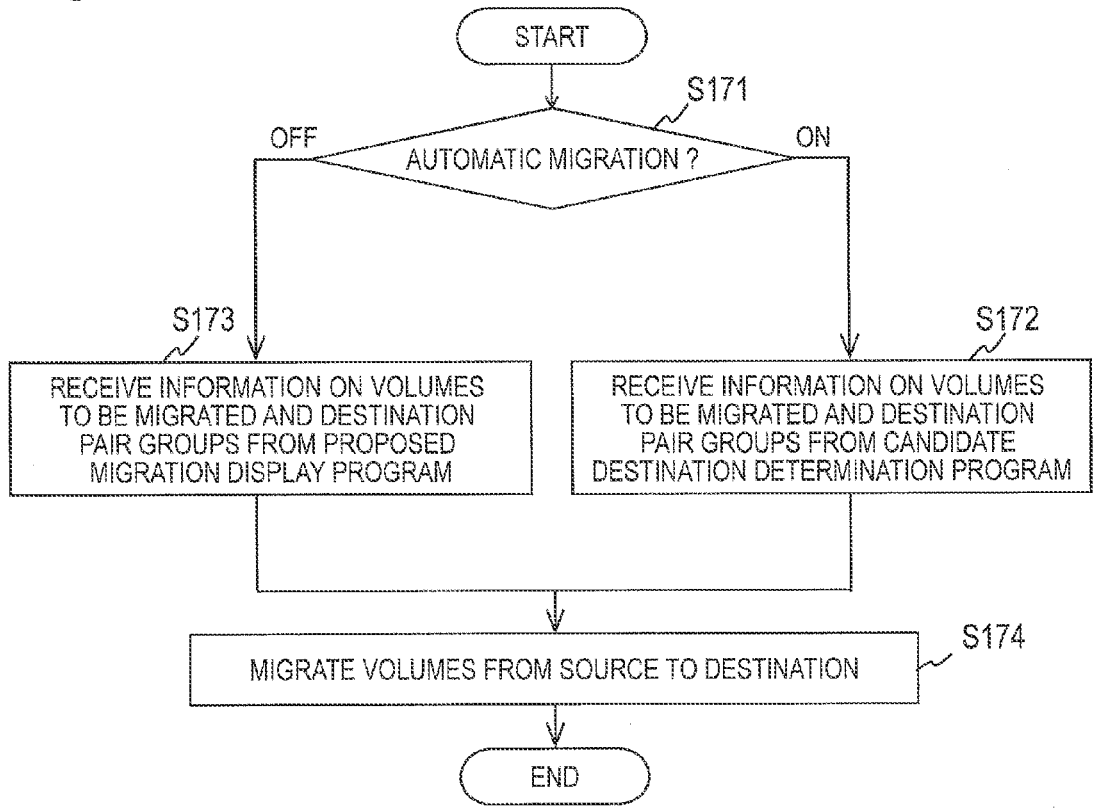

FIG. 3 schematically illustrates an example of a method of asynchronous remote copy;

FIG. 4 illustrates a configuration example of a storage management server;

FIG. 5 illustrates an example of a data transfer latency threshold setting image for copy groups;

FIG. 6 illustrates an example of a proposed migration list image;

FIG. 7 illustrates an example of data transfer latency threshold management table for copy groups;

FIG. 8 illustrates an example of a primary volume management table;

FIG. 9 illustrates an example of a pair group management table;

FIG. 10 illustrates an example of a pair group-related resource management table;

FIG. 11 illustrates an example of a write data amount management table;

FIG. 12 illustrates an example of a data transfer capability management table for ports;

FIG. 13 illustrates an example of a data transfer capability management table for processors;

FIG. 14 illustrates an example of a data transfer latency management table for pair groups;

FIG. 15 illustrates an example of a data transfer latency management table for copy groups;

FIG. 16 is a flowchart illustrating an example of the processing routine of a condition setting program;

FIG. 17 is a flowchart illustrating an example of the processing routine of a configuration and performance information collection program;

FIG. 18 is a flowchart illustrating the outline of the processing of a storage management program;

FIG. 19 is a flowchart illustrating an example of the processing routine of a data transfer delay detection program;

FIG. 20 is a flowchart illustrating an example of the processing routine of a candidate object determination program;

FIG. 21 is a flowchart illustrating an example of the processing routine of a candidate destination determination program;

FIG. 22 is a flowchart illustrating an example of the processing routine of a proposed migration display program; and FIG. 23 is a flowchart illustrating an example of the processing routine of a volume migration control program.

DETAILED DESCRIPTION OF THE EMBODIMENTS

Hereinafter, an embodiment of this invention is described with reference to the accompanying drawings. It should be noted that this embodiment is merely an example to realize has invention and is not to limit the technical scope of this invention. Elements common to the drawings are demoted by the same reference signs.

In the following description, information in this invention will be expressed as "aaa table", "aaa list", "aaa DB", "aaa queue", and the like; however, the information may be expressed in data structures other than tables, lists, DBs, queues, and the like. For this reason, to imply independency from such data structures, the "aaa table", "aaa list", "aaa DB", "aaa queue" or the like may be referred to as "aaa information".

Moreover, in describing specifics of the information, terms such as identification information, identifier, name, and ID are used; but they may be replaced with one another.

The following description includes descriptions with subjects of program but such descriptions may be replaced by those having subjects of processor because a program is executed by a processor to perform predetermined processing using a memory and a communication port (communication control device). In addition, the processing disclosed with descriptions having subjects of program may be taken as the processing performed by a computer such as a management server or an information processing apparatus. A part or all of a program may be implemented by dedicated hardware.

Programs may be installed in computers through a program distribution server or a computer-readable non-transitory storage medium. In this case, the program distribution server includes a CPU and storage resources; the storage resources holds a distribution program and a program to be distributed. The CPU executes the distribution program so that the CPU in the program distribution server distributes the program to be distributed to other computers.

Figure 1:
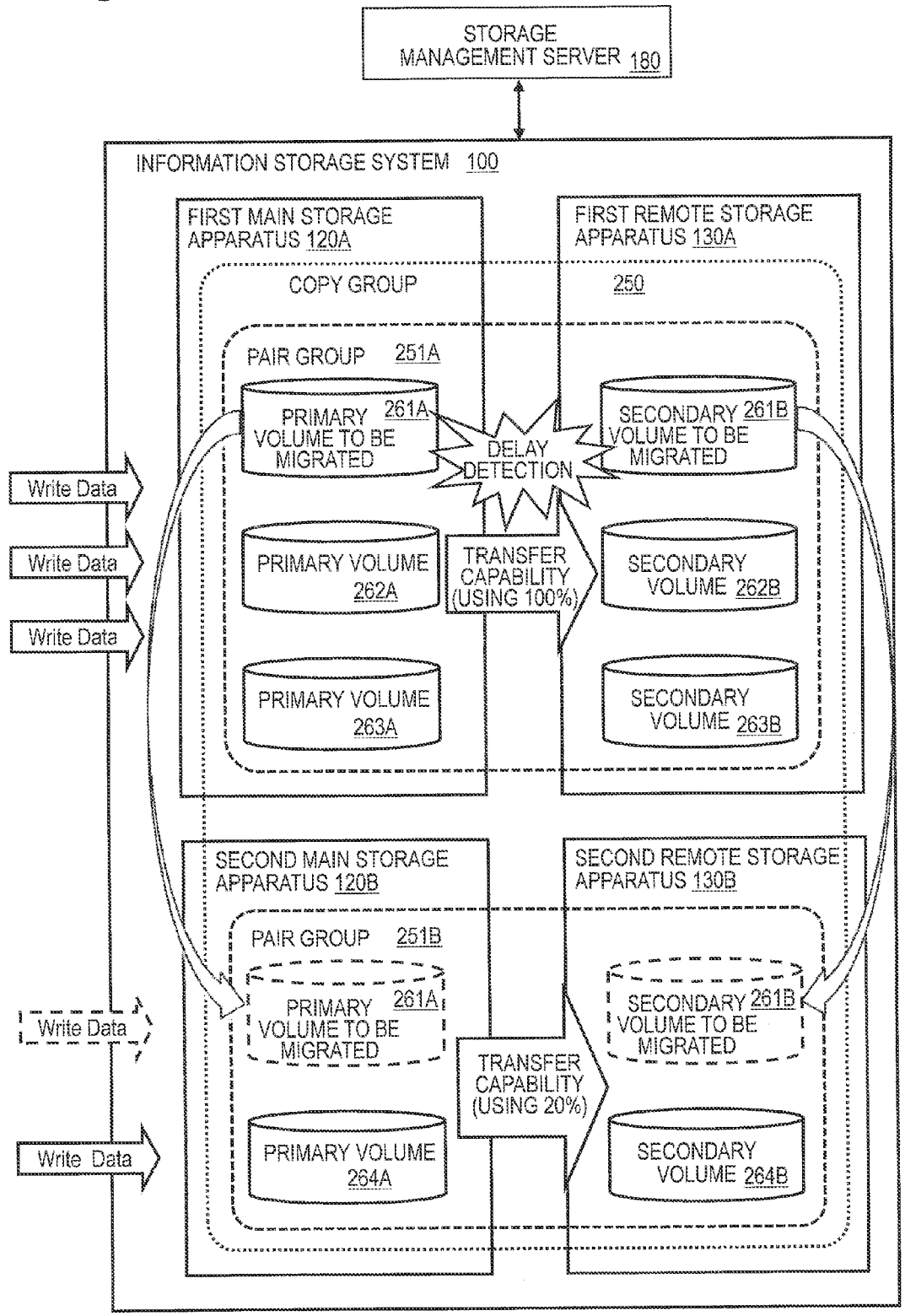
FIG. 1 is a diagram for illustrating the outline of the embodiment.

FIG. 1 is a diagram for illustrating the outline of this embodiment. A computer system includes an information storage system 100 and a storage management server 180 for managing the information storage system 100. The information storage system performs asynchronous remote copy.

In the example of FIG. 1, the information storage system 100 includes a first and a second main storage apparatuses 120A and 120B, a first and a second remote storage apparatuses 130A and 130B. The first main storage apparatus 120A and the first remote storage apparatus 130A constitute an apparatus pair for asynchronous remote copy. The second main storage apparatus 120B and the second remote storage apparatus 130B constitute an apparatus pair for asynchronous remote copy.

The first main storage apparatus 120A has primary volumes 261A to 263A and the first remote storage apparatus 130A has secondary volumes 261B to 263B. The primary volume 261A and the secondary volume 261B constitute an asynchronous remote copy pair. The primary volume 262A and the secondary volume 262B constitute an asynchronous remote copy pair. The primary volume 263A and the secondary volume 263B constitute an asynchronous remote copy pair. These three asynchronous remote copy pairs are included in a pair group 251A.

The second main storage apparatus 120B has a primary volume 264A and the second remote storage apparatus 130B has a secondary volume 264B. The primary volume 264A and the secondary volume 264B constitute an asynchronous remote copy pair. This asynchronous remote copy pair is included in a pair group 251B.

The pair groups 251A and 251B are allocated the resources of the storage apparatuses 120A, 120B, 130A, and 130B for the purpose of asynchronous remote copy. The allocated resources are, for example, processors and ports. Data transfer in asynchronous remote copy pairs included in the pair group 251A is performed by the resources allocated to the pair group 251A and the data transfer in the pair group 251B is performed by the resources allocated to the pair group 251B.

The pair groups 251A and 251B constitute a copy group 250. In the copy group, the order of writing host write data to the primary volumes 261A to 264A matches the order of copying the host write data to the secondary volumes 261B to 264B.

Upon detection of delay in copying in a copy group, the storage management server 180 identifies one or more pair groups in which transfer delay occurs from the pair groups included in the copy group. The storage management server 180 selects candidate primary volumes to be migrated (candidate asynchronous remote copy pairs to be migrated) from the identified one or more pair group. This method is applicable to a system in which no copy group is defined; depending on the design, candidate destinations may be selected from a different copy group.

The storage management server 180 selects, for each of the candidate primary volumes to be migrated, a pair group having resources at least a part of which are different from the resources of the pair group including the candidate primary volume to be migrated as a candidate destination pair group. The storage management server 180 indicates information on the selected candidate primary volumes to be migrated and candidate destination pair groups on the display device or alternatively, migrates the asynchronous remote copy pairs including the candidate primary volumes to be migrated to the candidate destination pair groups. This migration can reduce the data transfer delay in the source pair group without additional hardware.

Specific explanation follows. The storage management server 180 monitors the data transfer latency in asynchronous remote copy in the copy group 250. The example of FIG. 1 shows only one copy group 250, but the information storage system 100 can have a plurality of copy groups.

The data transfer latency means the delay time between writing write data to a primary volume and writing the write data to a secondary volume, namely, the latency in transferring the write data. The storage management server 180 periodically acquires data transfer latency of each copy group from the information storage system 100. The data transfer latency of a copy group is, for example, the highest value among the data transfer latencies of all asynchronous remote copy pairs included in the copy group.

The storage management server 180 compares the data transfer latency of each copy group with a threshold assigned to each copy group to detect a copy group in which asynchronous remote copy is being delayed. In this example, it is assumed that the data transfer latency of the copy group 250 is higher than the threshold.

The storage management server 180 identifies pair groups of which the data transfer latencies are higher than the threshold from the copy group 250. The data transfer latency of a pair group may be the highest value among the data transfer latencies of all the asynchronous remote copy pairs included in the pair group. In this example, it is assumed that the data transfer latency of the pair group 251A is higher than the threshold.

The storage management server 180 compares the amount of write data for the pair group 251A with the data transfer capability of the resources allocated to the pair group 251A to determine the amount of write data to be migrated (migration write data amount). The transfer capability and the amount of write data may be indicated by the amount of data per unit time.

The storage management server 180 determines one or more candidate primary volumes to be migrated with reference to the amount of write data in each of the primary volumes 261A to 263A in the pair group 251A and the foregoing migration write data amount. For example, the one or more candidate primary volumes to be migrated are selected in such a manner that the total amount of write data for the candidate primary volumes to be migrated will not be less than the migration write data amount. In the example of FIG. 1, the primary volume 261A (and the secondary volume 261B) is selected as a candidate primary volume (asynchronous remote copy pair) to be migrated (a candidate object).

The storage management server 180 selects pair groups in which the data transfer capability of the resources is higher than the amount of write data, or pair groups having a margin in the transfer capacity, from the pair groups in the same copy group as candidate destinations. In the example of FIG. 1, the pair group 251B is selected as a candidate destination pair group.

The storage management server 180 selects a candidate destination pair group for each of the candidate primary volumes to be migrated from the selected pair groups. The pair groups sharing all the allocated resources with the pair group including the candidate primary volume to be migrated are excluded for the candidate destination. Hence, data transfer delay in the source pair group can be reduced by migration of asynchronous remote copy pairs. In an example, pair groups sharing at least a part of the allocated resources with the pair group including the candidate primary volume to be migrated may be excluded from the candidate destinations. Consequently, data transfer delay in the source pair group can be reduced more definitely.

For example, the storage management server 180 selects candidate primary volumes to be migrated one by one and, for each of the selected candidate primary volumes to be migrated, selects a pair group in which the allocated resources are different from those of the candidate primary volume and the amount of write data for the candidate primary volume is not more than the margin in the transfer capacity as a candidate destination pair group.

In an example, the storage management server 180 may select a pair group having the largest margin in the transfer capacity and if the margin in the transfer capacity of the selected pair group is smaller than the amount of write data for the candidate primary volume to be migrated, it removes the primary volume (asynchronous remote copy pair) from the candidate objects.

The storage management server 180 instructs the information storage system 100 to migrate the asynchronous remote copy pairs including the selected primary volumes to be migrated to the storage apparatuses including the selected destination pair groups. In the example of FIG. 1, the primary volume 261A is migrated to the second main storage apparatus 120B and the secondary volume 261B is migrated to the second remote storage apparatus 130B.

Before instructing the information storage system 100 to perform migration, the storage management server 180 may display information about the selected candidate primary volumes to be migrated and the candidate destination pair groups on the display device. In response to input from the administrator, the storage management server 180 instructs the information storage system 100 to perform migration of the designated asynchronous remote copy pairs to the designated destination pair groups.

Figure 2:
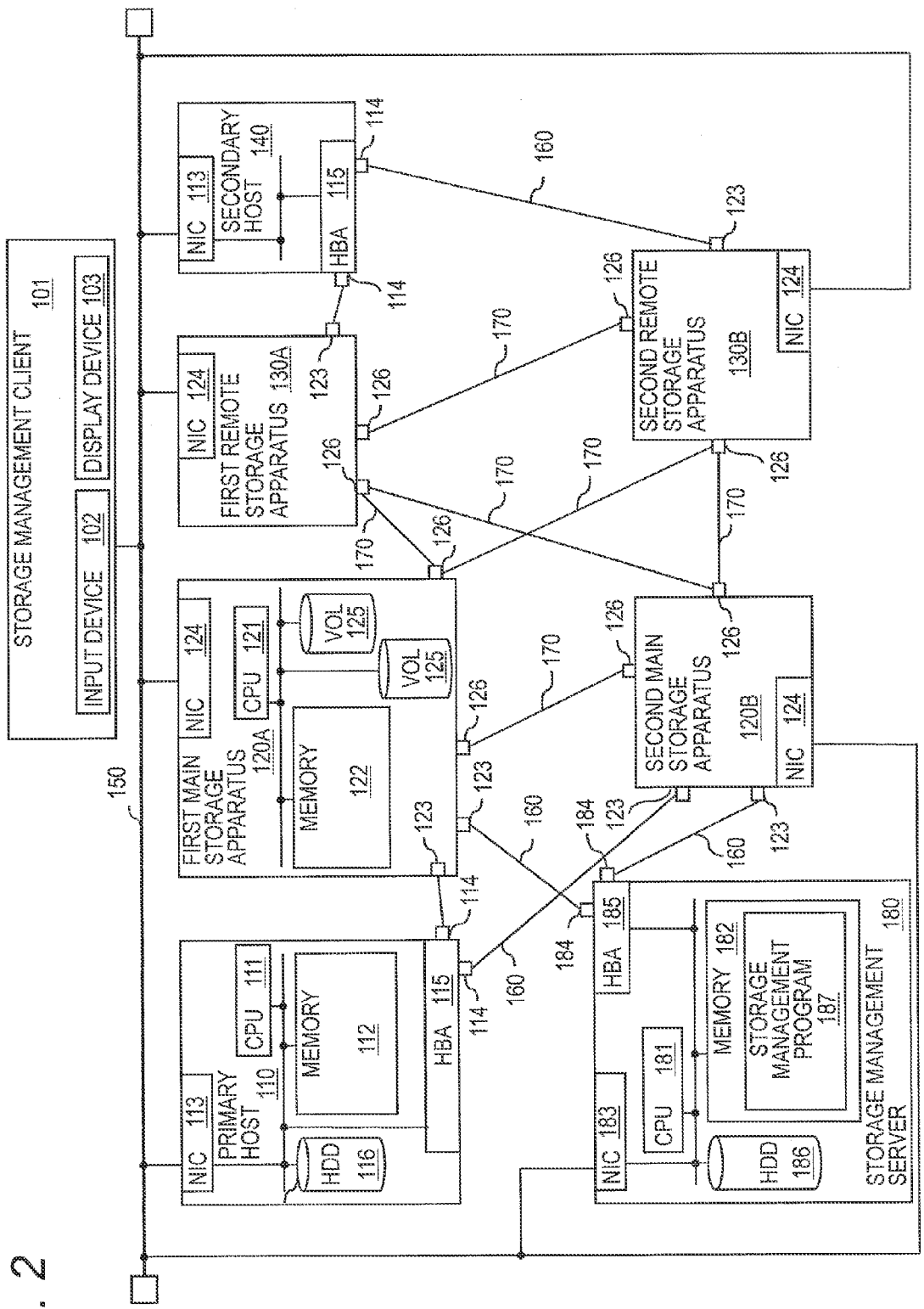
FIG. 2 is a block diagram schematically illustrating an example of a system configuration in the embodiment.

FIG. 2 is a block diagram schematically illustrating an example of the system configuration in this embodiment. The first and second main storage apparatuses 120A and 120B and the first and the second remote storage apparatuses 130A and 130B may have the same configuration. The first main storage apparatus 120A and the first remote storage apparatus 130A constitute an apparatus pair for asynchronous remote copy. In similar, the second main storage apparatus 120B and the second remote storage apparatus 130B constitute an apparatus pair for asynchronous remote copy. Each storage apparatus may form a pair for asynchronous remote copy with other storage apparatuses.

In FIG. 2, the first main storage apparatus 120A includes a CPU 121 of a processor, a memory 122 of a primary storage device, a network interface card (NIC) 124 for connecting to a LAN 150, and logical volumes 125. For example, the logical volumes 125 are storage areas of one or more non-volatile storage devices such as HDDs or SSDs.

The first main storage apparatus 120A further includes host ports 123 for connecting to a network for communication with a primary host 110 and a storage management server 180 and storage ports 126 for connecting to an inter-storage network for communication with other storage apparatuses. For data communication among storage apparatuses and hosts, a storage area network (SAN) may be used. At least a part of these networks may be the same network.

The numbers of components in the first main storage apparatus 120A depend on the design. For example, the example of FIG. 2 shows one CPU 121 by way of example; however, the first main storage apparatus 120A generally includes a plurality of CPUs 121. The same applies to the other apparatuses.

The primary host 110 accesses the first and the second main storage apparatuses 120A and 120B; the secondary host 140 accesses the first and the second remote storage apparatuses 130A and 130B. The primary host 110 and the secondary host 140 constitute a cluster; when a failure occurs in the primary host 110, the secondary host 140 takes over the services.

The primary host 110 and the secondary host 140 may have the same configuration. In FIG. 2, the primary host 110 includes a CPU 111 of a processor, a memory 112 of a primary storage device, a NIC 113, a host bus adapter (HBA) 115 and ports 114 for communication with the storage apparatuses, and an HDD 116 of an auxiliary storage device. In the hosts 110 and 140, the numbers of components depend on the design.

A storage management client 101 is an apparatus such as a personal computer, a workstation, or a thin client terminal for providing a user interface function of the service system. The storage management client 101 provides a user interface function of the storage management program 187.

The storage management client 101 includes an input device 102 for receiving inputs from the user (administrator) and a display device 103 for displaying information to the user. The display device 103 may be an image display device such as a CRT or a liquid crystal display device. Examples of images to be displayed on the display device 103 are described later with reference to FIGS. 5 and 6. The storage management client 101 communicates with the storage management program 187 in the storage management server 180 and other programs via the LAN 150.

The storage management server 180 includes a CPU 181 of a processor, a memory 182 of a primary storage device, a NIC 183, host ports 184, a host bus adapter (HBA) 185, and an HDD 186 of an auxiliary storage device. The storage management program 187 is held in the HDD 186 and loaded to the memory 182 to be executed by the CPU 181. In the storage management client 101 and the storage management server 180, the numbers of components depend on the design.

In this example, the storage management client 101 and the storage management server 180 constitute a management system. The management system may be configured with a single computer. The management system may include a plurality of clients and servers; for example, a plurality of management servers may bear part of the processing described hereinafter.

FIG. 3 schematically illustrates an example of a method of asynchronous remote copy. FIG. 3 illustrates asynchronous remote copy between the first main storage apparatus 120A and the first remote storage apparatus 130A by way of example. The first main storage apparatus 120A and the first remote storage apparatus 130A have three pair groups 255A, 255C, and 255D.

The pair group 255A includes a plurality of primary volumes 256, a primary journal volume 257, a secondary journal volume 258, and a plurality of secondary volumes 259. A pair group can include a plurality of primary journal volumes and a plurality of secondary journal volumes. A pair group may include one pair. The other pair groups 255C and 255D each include one or more primary and secondary volumes and primary and secondary journal volumes.

In this example, a pair group includes all volume pairs that use the primary and secondary journal volumes assigned to the pair group. For example, the pair group 255A consists of a primary journal volume 257, a secondary journal volume 258, and all primary and secondary volumes 256 and 259 that use these journal volumes. Although this example defines pair groups with journal volumes, asynchronous remote copy may be performed without using journal volumes or pair groups may be defined independently from journal volumes.

Asynchronous remote copy writes host write data for a primary volume in the main storage apparatus to the primary volume and further copies the same data to a secondary volume in the remote storage apparatus. Upon completion of write to the primary volume, the asynchronous remote copy notifies the host of the completion of writing the host write data to the secondary volume without waiting for the completion of write.

For example, upon receipt of a host write command for a primary volume 256, the first main storage apparatus 120A writes the write data to the primary volume 256 (wherein, the write includes write to the cache). Further, the first main storage apparatus 120A creates a data unit called a journal including the write data and writes it to the primary journal volume 257.

The journal includes a write address in the primary volume 256 and a timestamp (TS#) managed by the first main storage apparatus 120A in addition to the write data. For example, the storage management server 180 periodically issues timestamps at predetermined intervals and sends them to the first and the second main storage apparatuses 120A and 120B. The first and the second main storage apparatuses 120A and 120B include the latest timestamp numbers in journals.

The first main storage apparatus 120A sends journals that have not been transferred to the first remote storage apparatus 130A in response to a request from the remote storage apparatus 130A. The remote storage apparatus 130A stores the received journals in the secondary journal volume 258 and thereafter, writes the write data from the secondary journal volume 258 to the secondary volumes 259 (wherein, the write includes write to the cache).

The remote storage apparatuses 130A and 130B restore the data to the secondary volumes in order of timestamp from the oldest to the newest. As a result, the order of data update in the primary volumes can be kept in the data update in the secondary volumes within the copy group. In this way, matching update points among storage apparatuses with timestamps enables data copy to keep consistency within the copy group.

FIG. 4 illustrates a configuration example of the storage management server 180. The CPU 181 is a processor for executing software programs loaded from the HDD 186 of an auxiliary storage device to the memory 182 of a primary storage device. In the following description, the processing performed by the software programs loaded to the memory 182 is actually performed by the CPU 181 executing the software programs.

The memory 182 is a semiconductor storage device such as a dynamic RAM. For the HDD 186, a semiconductor storage device such as a flash memory may be used, instead of a hard disk drive. The memory 182 stores the software programs loaded from the HDD 186 and executed by the CPU 181 and data to be referred to by the CPU 181.

Specifically, executed by the CPU 181 are at least programs included in the storage management program 187, such as a condition setting program 201, a configuration and performance information collection program 202, a data transfer delay detection program 205, a candidate object determination program 206, a candidate destination determination program 207, a proposed migration display program 203, and a volume migration control program 204. The memory 182 further stores configuration management information 208, performance and capacity information 209, data transfer latency information 210, and data transfer latency threshold management table 501.

The NIC 183 is used for the storage management server 180 to communicate with the storage management client 101 and other apparatuses via the LAN 150. The HBA 185 is used for the storage management server 180 to communicate with the first main storage apparatus 120A and other apparatuses. The HBA 185 has ports 184 as connection terminals for communication cables.

The storage management server 180 may use the Fibre channel (FC) protocol in inputting and outputting data to and from the first main storage apparatus 120A and other apparatuses, but may use other protocol. The storage management server 180 may use the NIC 183 and the LAN 150 to communicate with the first main storage apparatus 120A and other apparatuses, instead of the HBA 185.

The condition setting program 201 stores thresholds of data transfer latency for copy groups individually specified on a data transfer latency threshold setting image for copy groups 301 (refer to FIG. 5) displayed on the display device 103 of the storage management client 101 to the data transfer latency threshold management table for copy groups 501.

The configuration and performance information collection program 202 collects configuration information and performance (capacity) information on the storage apparatuses 120A, 120B, 130A, and 130B and stores them to the configuration management information 208 and the performance and capacity information 209.

The configuration management information 208 includes a primary volume management table 601, a pair group management table 701, and a pair group-related resource management table 801. The performance and capacity information 209 includes a write data amount management table 901, a data transfer capability management table for ports 951, and a data transfer capability management table for processors 961. Details of the tables are described later with reference to FIGS. 7 to 13.

The storage management program 187 identifies a copy group in which data transfer is delayed with reference to the data transfer latency thresholds for copy groups stored by the condition setting program 201 and the configuration and performance information collected by the configuration and performance information collection program 202, determines candidate volumes to be migrated and candidate destination pair groups, and notifies the proposed migration display program 203 and the volume migration control program 204.

The proposed migration display program 203 receives information on the candidate volumes to be migrated and the candidate destination pair groups issued by the candidate destination determination program 207 and displays a proposed migration list image 401 (FIG. 6). The information on the volumes to be migrated and the destination pair groups selected in the proposed migration list image 401 is sent to the volume migration control program 204.

The volume migration control program 204 instructs, in the case where automatic migration is set at ON, the main and the remote storage apparatuses to perform migration upon receipt of information on the volumes to be migrated and the destination pair groups from the candidate destination determination program 207. In the case where automatic migration is set at OFF, the volume migration control program 204 instructs the main and the remote storage apparatuses to perform migration upon receipt of information on the volumes to be migrated and the destination pair groups designated by the user from the storage management client 101.

Next, examples of images displayed by the proposed migration display program 203 are described with reference to FIGS. 5 and 6. FIGS. 5 and 6 are examples of images displayed by the display device 103 of the storage management client 101 in accordance with instructions from the proposed migration display program 203.

FIG. 5 illustrates an example of a data transfer latency threshold setting image for copy groups 301 for the user to specify thresholds of data transfer latency for individual copy groups. The condition setting program 201 creates the image 301 to be displayed and sends it to the storage management client 101. The data transfer latency threshold setting image for copy groups 301 includes a column for indicating copy group names, a current value column for indicating current thresholds, and a new value column allowing the user to enter values for setting thresholds. Each row corresponds to one of the rows of the data transfer latency threshold management table for copy groups 501.

The copy group column corresponds to the names 503 in the data transfer latency threshold management table for copy groups 501 (refer to FIG. 7). The current value column corresponds to the data transfer latency thresholds 504 in the data transfer latency threshold management table for copy groups 501. When the user enters a value different from the current value in a new value held and presses the UPDATE button in the data transfer latency threshold setting image for copy groups, the condition setting program 201 updates a data transfer latency threshold 504 in the data transfer latency threshold management table for copy groups 501 into the value entered in the new value field.

Below the threshold column, a button is displayed that is used by the user to request update of the data transfer latency threshold for a copy group. The user can request update of the data transfer latency threshold for a copy group with the input device 102 of the storage management client 101.

FIG. 6 illustrates an example of a proposed migration list image 401. In the case where automatic migration is set at OFF in the storage management program 187, the proposed migration display program 203 creates data for this image 401 and sends it to the storage management client 101. The proposed migration list image 401 shows a list of combinations of candidate volumes to be migrated and candidate destinations and changes in data transfer latency caused by the migration.

The proposed migration list image 401 includes columns of a copy group name indication column, a migration source indication column, a migration destination indication column, a percentage (%) of threshold (current value) column, a percentage (%) of threshold (estimated value after migration) column, and a check column. The migration source indication column includes columns of pair group IDs, apparatus IDs, and VOL IDs. The migration destination indication column includes columns of pair group IDs and apparatus IDs. Each row corresponds to one of the combinations of source volumes and a destination pair group notified by the candidate destination determination program 207.

The copy group column corresponds to the names 503 in the data transfer latency threshold management table for copy group 501. The pair group IDs, the apparatus IDs, and the VOL IDs included in the migration source column respectively correspond to the pair group IDs 703, the main storage apparatus IDs 704, and the primary volume IDs 705 in the pair group management table 701 (refer to FIG. 9). The source volumes to be indicated are the candidate volumes to be migrated notified of by the candidate object determination program 206.

The pair group IDs and the apparatus IDs included in the migration destination column respectively correspond to the remote storage apparatus IDs 706 and the secondary volume IDs 707 in the pair group management table 701 and the destination pair groups to be indicated are the candidate destination pair groups notified of by the candidate destination determination program 207.

The percentage (%) of threshold (current value) is a value obtained by multiplying the result of division of the data transfer latency 983 in the data transfer latency management table for copy groups 981 by the data transfer latency threshold 504 in the data transfer latency threshold management table for copy groups 501 by 100.

The percentage (%) of threshold (estimated value after migration) is a value indicating the rate of the estimated data transfer latency after migration of the source volumes corresponding to the row to the destination pair group with respect to the data transfer latency threshold 504 in the data transfer latency management table 501.

The estimated data transfer latency after migration is calculated from the rate of increase in the amount of write data in the copy destination. For example, assuming that, in the write data amount management table 901, the sum of the amounts of write data for the primary volumes included in the destination pair group is 40 MB (the sum of the values for PVOLs #21 and #22) and the sum of the amounts of write data for the volumes to be migrated is 40 MB (the value for PVOL #12), the amount of write data will be 200%.

Accordingly, it is estimated that the data transfer latency 973 in the data transfer latency management table for pair groups 971 will also be 200%. That is to say, since the data transfer latency of PAIR #2 is 1TS#, the data transfer latency after migration is estimated at 2TS#.

On the other hand, the result of subtracting the amount of write data 40 MB to be migrated (the value for PVOL #12) from the sum of the amounts of write data 140 MB for the source pair group (the sum of the values for PVOL #11, #12, and #13) in the write data amount management table 901 is 100 MB. Since the amount of write data is 71% of the current value, it is estimated that the data transfer latency 973 for the pair group in the data transfer latency management table 971 will also be 71%. That is to say, since the data transfer latency of PAIR #1 is 4TS#, it is estimated that the data transfer latency will be 3TS#.

If the data transfer latency of PAIR #1 is 3TS# and the data transfer latency of PAIR #2 is 2TS#, the data transfer latency 983 of CTG1 in the data transfer latency management table for copy groups 981 is estimated at 3TS#. The value obtained by multiplying the result of division of the data transfer latency 3TS# of CTG1 by the data transfer latency threshold 504 in the data transfer latency threshold management table for copy groups 501 by 100 is indicated in the percentage (%) of threshold (estimated value after migration) in the proposed migration list image 401.

As to the check column, when the user checks one or more intended candidates in the proposed migration list and presses the MIGRATE button, a list of checked sets of the volumes to be migrated and the destination pair groups is sent to the volume migration control program 204 and the migration is executed.

Below the check column, a button is displayed for the user to execute migration of the discretionally selected volumes. The user operates the button with the input device 102 of the storage management client 101 to issue an instruction to execute migration of any of the volumes displayed in the proposed migration list image 401.

Next, configuration examples of the data transfer latency threshold management table for copy groups 501, the configuration management information 208, the performance and capacity information 209, the data transfer latency information 210 to be used by the storage management program 187 are described with reference to FIGS. 7 to 15.

The configuration management information 208 includes a primary volume management table 601, a pair group management table 701, and a pair group-related resource management table 801. The performance and capacity information 209 includes a write data amount management table 901, a data transfer capability management table for ports 951, and a data transfer capability management table for processors 961. The data transfer latency information 210 includes a data transfer latency management table for pair groups 971 and a data transfer latency management table for copy groups 981.

FIG. 7 illustrates an example of the data transfer latency threshold management table for copy groups 501. The data transfer latency threshold management table for copy groups 501 holds data transfer latency thresholds for copy groups and has a copy group ID column 502, a name column 503, and a data transfer latency threshold column 504. Each row of the table corresponds to a copy group managed by the storage management program 187.

The data transfer latency threshold management table for copy groups 501 is created by the condition setting program 201 based on the information collected from the latency thresholds for copy groups entered in the data transfer latency threshold setting image for copy groups 301 or recommended values preset to the system.

The copy group ID column 502 stores identifiers of copy groups. The name column 503 stores names of the copy groups. The data transfer latency threshold column 504 stores thresholds of data transfer latency specified for the copy groups.

FIG. 8 illustrates an example of the primary volume management table 601. The primary volume management table 601 holds information on primary volumes in the storage apparatuses and has an apparatus ID column 602, a volume ID column 603, and a capacity column 604. Each row of the table corresponds to a primary volume in a storage apparatus managed by the storage management program 187. The configuration and performance information collection program 202 creates the pair group management table 701 based on the information collected from the storage apparatuses.

The apparatus ID column 602 stores identifiers of storage apparatuses. The volume ID column 603 stores identifiers of volumes. The capacity column 604 stores capacities of the volumes. The configuration and performance information collection program 202 creates the primary volume management table 601 based on the information collected from the storage apparatuses.

FIG. 9 illustrates an example of the pair group management table 701. The pair group management table 701 holds information on pairs of a primary volume and a secondary volume (asynchronous remote copy pairs) included in pair groups and association information on the copy groups the pair groups belong to. Each row of the table corresponds to an asynchronous remote copy pair managed by the storage management program 187.

The pair group management table 701 has a copy group ID column 702, a pair group ID column 703, a main storage apparatus ID column 704, a primary volume ID column 705, a remote storage apparatus ID column 706, and a secondary volume ID column 707.

The copy group ID column 702 stores identifiers of copy groups to which asynchronous remote copy pairs (pair groups) belong. The pair group ID column 703 stores identifiers of the pair groups to which the asynchronous remote copy pairs belong. The main storage apparatus ID column 704 stores identifiers of the main storage apparatuses including the asynchronous remote copy pairs. The primary volume ID column 705 stores identifiers of the primary volumes of the asynchronous remote copy pairs.

The remote storage apparatus ID column 706 stores identifiers of the remote storage apparatuses including the asynchronous remote copy pairs. The secondary volume ID column 707 stores identifiers of the secondary volumes of the asynchronous remote copy pairs.

FIG. 10 illustrates an example of the pair group-related resource management table 801. The pair group-related resource management table 801 holds information on resources allocated to pair groups to be used in transferring copy data. Each row of the table corresponds to a pair group managed by the storage management program 187. A part or all of the allocated resources may be common to different pair groups. The configuration and performance information collection program 202 creates the pair group-related resource management table 801 based on the information collected from the storage apparatuses.

The pair group-related resource management table 801 has a pair group ID column 802, a main storage apparatus ID column 803, a main storage apparatus port ID column 804, a main storage apparatus processor ID column 805, a remote storage apparatus ID column 806, a remote storage apparatus port ID column 807, and a remote storage apparatus processor ID column 808.

The pair group ID column 802 stores identifiers of pair groups. The main storage apparatus ID column 803 stores identifiers of the main storage apparatuses including the pair groups. The main storage apparatus port ID column 804 stores identifiers of the ports of the main storage apparatuses allocated to the pair groups. The main storage apparatus processor ID column 805 stores identifiers of the processors of the main storage apparatuses allocated to the pair groups.

The remote storage apparatus ID column 806 stores identifiers of the remote storage apparatuses including the pair groups. The remote storage apparatus port ID column 807 stores identifiers of the ports of the remote storage apparatuses allocated to the pair groups. The remote storage apparatus processor ID column 808 stores identifiers of the processors of the remote storage apparatuses allocated to the pair groups.

FIG. 11 illustrates an example of the write data amount management table 901. The write data amount management table 901 holds the amounts of write data for primary volumes in each storage apparatus. For example, each row of the table corresponds to the write data for the same primary volume assigned the same timestamp (TS#). The configuration and performance information collection program 202 creates the write data amount management table 901 based on the information collected from the storage apparatuses.

The write data amount management table 901 has an apparatus ID column 902, a primary volume ID column 903, a timestamp column 904, and a write data amount column 905. The apparatus ID column 902 stores identifiers of storage apparatuses holding primary volumes where to write the write data.

The primary volume ID column 903 stores identifiers of primary volumes where to write the write data. The timestamp column 904 stores timestamps (TS#) assigned to the write data. A timestamp is included in the journal of write data. The write data amount column 905 scores amounts of write data.

FIG. 12 illustrates aft example of the data transfer capability management table for ports 951. The data transfer capability management table for ports 951 holds data transfer capabilities of ports. Each row of the table indicates the data transfer capability of a port managed by the storage management program 187. The configuration and performance information collection program 202 creates the data transfer capability management table for ports 951 based on the information collected from the storage apparatuses.

The data transfer capability management table for ports 951 has an apparatus ID column 952, a port ID column 953, and a data transfer capability column 954. The apparatus ID column 952 stores identifiers of the storage apparatuses holding the ports. The port ID column 953 holds identifiers of the ports. The data transfer capability column 954 holds values of transfer capability of the ports, such as the amount of data transfer per second.

FIG. 13 illustrates an example of the data transfer capability management table for processors 961. The data transfer capability management table for processors 961 holds data transfer capabilities of processors. Each row of the table corresponds to the data transfer capability of a processor managed by the storage management program 187. The configuration and performance information collection program 202 creates the data transfer capability management table for processors 961 based on the information collected from the storage apparatuses.

The data transfer capability management table for processors 961 has an apparatus ID column 962, a processor ID column 963, and a data transfer capability column 964. The apparatus ID column 962 stores identifiers of the storage apparatuses holding the processors. The processor ID column 963 holds identifiers of the processors. The data transfer capability column 964 holds values of transfer capability of the processors, such as the amount of data transfer per second.

FIG. 14 illustrates an example of the data transfer latency management table for pair groups 971. The data transfer latency management table for pair groups 971 holds data transfer latencies of pair groups. Each row of the table corresponds to the data transfer latency of a pair group managed by the storage management program 187. The data transfer delay detection program 205 creates the data transfer latency management table for pair groups 971 based on the information collected from the storage apparatuses.

The data transfer latency management table for pair groups 971 has a pair group ID column 972 and a data transfer latency column 973. The pair group ID column 972 stores identifiers of the pair groups. The data transfer latency column 973 holds the latest latencies in data transfer by the pair groups.

FIG. 15 illustrates an example of the data transfer latency management table for copy groups 981. The data transfer latency management table for copy groups 981 holds data transfer latencies of copy groups. Each row of the table corresponds to the data transfer latency of a copy group managed by the storage management program 187. The data transfer delay detection program 205 creates the data transfer latency management table for copy groups 981 based on the information in the data transfer latency management table for pair groups 971 and the Information in the pair group management table 701.

The data transfer latency management table for copy groups 981 has a copy group ID column 982 and a data transfer latency column 983. The copy group ID column 982 stores identifiers of the copy groups. The data transfer latency column 983 holds the latest latencies in data transfer by the copy groups. Specifically, each field includes the highest value in the data transfer latencies of the pair groups included in the copy group.

Next, the processing performed by the storage management program 187 is described with reference to the flowcharts of FIGS. 16 to 23. FIG. 16 is a flowchart illustrating an example of a processing routine of the condition setting program 201 included in the storage management program 187.

The processing routine illustrated in FIG. 16 is started in response to press of the UPDATE button in the data transfer latency threshold setting image for copy groups 301 after the user enters a threshold different from the current value in a new value held using the input device 102 of the storage management client 101. The processing performed by the condition setting program in the description of FIG. 16 is actually performed by the CPU 181 that executes the storage management program 187.

The condition setting program 201 acquires the entered threshold of latency from the storage management client 101 (S101). The condition setting program 201 converts the acquired threshold into a value in unit of timestamp and stores it to the data transfer latency threshold 504 in the data transfer latency threshold management table 501. For example, if the interval between timestamps issued by the storage management server 180 is 1 second and the entered threshold value is 3 seconds, the condition setting program 201 stores a value 3TS# in the data transfer latency threshold management table 501.

FIG. 17 is a flowchart illustrating an example of a processing routine of the configuration and performance information collection program 202 included in the storage management program 187. The storage management program 187 periodically starts the processing routine illustrated in FIG. 17. The processing performed by the configuration and performance information collection program 202 in the description of FIG. 17 is actually performed by the CPU 181 that executes the storage management program 187.

The configuration and performance information collection program 202 acquires a list of copy groups from the storage apparatuses under management (S111). The configuration and performance information collection program 202 acquires a list of pair groups from the storage apparatuses under management (S112).

The configuration and performance information collection program 202 acquires a list of primary volumes and information on capacities of the primary volumes from the storage apparatuses under management and stores them to the primary volume management table 601 (S113).

The configuration and performance information collection program 202 acquires association relation information between copy groups and pair groups, creates data to be stored in each row of the pair group management table 701 from the acquired information together with information acquired at Steps S111 and S112, and stores the data (S114). The configuration and performance information collection program 202 acquires information on resources allocated to each pair group from the storage apparatuses under management and stores it to the pair group-related resource management table 801 (S115).

The configuration and performance information collection program 202 acquires the amounts of write data for the primary volumes from the storage apparatuses under management and stores them to the write data amount management table 901 (S116).

The configuration and performance information collection program 202 acquires information on data transfer capabilities of the ports from the storage apparatuses under management and stores it to the data transfer capability management table for ports 951 (S117). The configuration and performance information collection program 202 acquires information on data transfer capabilities of the processors from the storage apparatuses under management and stores it to the data transfer capability management table for processors 961 (S118).

FIG. 18 is a flowchart illustrating the outline of the processing performed by the programs included in the storage management program 187. The data transfer delay detection program 205 monitors data transfer latencies of the copy groups (S121) and identifies a pair group in which data transfer delay occurs (S122).

The candidate object determination program 206 determines candidate volumes to be migrated (S123) and the candidate destination determination program 207 determines candidate destination pair groups (S124). The volume migration control program 204 instructs the relevant storage apparatuses to migrate volumes to be migrated to destination pair groups (S125).

FIG. 19 is a flowchart illustrating an example of the processing routine of the data transfer delay detection program 205 included in the storage management program 187. This flowchart corresponds to Steps S121 and S122 in the flowchart of FIG. 18. The routine illustrated in FIG. 19 is periodically started by the storage management program 187. The processing performed by the data transfer delay detection program 205 in the description of FIG. 19 is actually performed by the CPU 181 that executes the storage management program 187.

The data transfer delay detection program 205 refers to the values of timestamps (TS#) periodically issued by the storage management server 180 (S131) and calculates a data transfer latency of each pair group (S132).

For example, the data transfer delay detection program 205 subtracts a reached timestamp number (TS#) from a received timestamp number (TS#) and stores the result to the data transfer latency management table for pair groups 971 as a data transfer latency of the pair group. The received timestamp number (TS#) is the latest timestamp number among the timestamps received by the main storage apparatus. The reached time stamp number (TS#) is the timestamp number included in the latest journal among the journals received by the remote storage apparatus.

Although this example calculates a data transfer latency using timestamp numbers, the data transfer latency may be calculated from other value. The data transfer latency represents the difference between the time of write to the main storage apparatus and the time of write to the remote storage apparatus. The method of calculating the data transfer latency can be selected from a plurality of methods.

For example, the time of write to the main storage apparatus may be represented by the time of issuance of a write command from the host, the time of receipt of a write command (including write data) from the host, the time of write to the primary volume, the time of write to the primary journal volume, or the like. The time of write to the remote storage apparatus may be represented by the time of retrieval from the primary journal volume, the time of write to the secondary journal volume, the time of write to the secondary volume, or the like.

Next, the data transfer delay detection program 205 calculates a data transfer latency of each copy group from the data transfer latencies of all pair groups in the same copy group (S133). For example, data transfer delay detection program 205 selects the highest value among the data transfer latencies for all the pair groups in a copy group and stores it to the data transfer latency management table for copy groups 981.

Further, the data transfer delay detection program 205 compares the calculated data transfer latencies of the copy groups with their respective predetermined thresholds (S134). The data transfer delay detection program 205 acquires the thresholds from the data transfer latency threshold column 504 in the data transfer latency threshold management table for copy groups 501.

If the calculated data transfer latency of a copy group is higher than the threshold (S134: YES), the data transfer delay detection program 205 identifies the pair groups of which data transfer latencies are higher than the threshold (S135). The pairs to be identified are the pairs for which the values acquired from the data transfer latencies 973 in the data transfer latency management table for pair groups 971 are higher than the data transfer latency threshold 504 in the data transfer latency threshold management table for copy groups 501.

Further, the data transfer delay detection program 205 creates a list of the pair groups identified at Step S135 and sends it to the candidate object determination program 206 (S136). If, at Step S134, the data transfer latencies are not higher than the threshold (S134: NO), the data transfer delay detection program 205 exists this flow.

FIG. 20 is a flowchart illustrating an example of the processing routine of the candidate object determination program 206 included in the storage management program 187. This flowchart corresponds to Step S123 in the flowchart of FIG. 18.

The processing routine illustrated in FIG. 20 is started when the data transfer delay detection program 205 issues a list of pair groups in which data transfer delay occurs. The processing performed by the candidate object determination program 206 in the description of FIG. 20 is actually performed by the CPU 181 that executes the storage management program 187.

The candidate object determination program 206 receives a list of pair groups in which data transfer latencies exceed a threshold in each copy group from the data transfer delay detection program 205 (S141).

The candidate object determination program 206 calculates the total amount of write to all the primary volumes of each pair group included in the list (S142). This example calculates the total amount of write per unit time.

Specifically, the candidate object determination program 206 selects the pair groups one by one from the list of pair groups. The candidate object determination program 206 identifies all the primary volumes included in each of the selected pair groups with reference to the pair group management table 701.

Furthermore, the candidate object determination program 206 refers to the write data amount management table 901 and calculates the total sum of the amounts of write in all entries of the primary volumes identified as above. The candidate object determination program 206 calculates the total amount of write per unit time from the total sum of the amounts of write and the timestamp numbers. For example, the candidate object determination program 206 converts the difference between the oldest timestamp number and the newest timestamp number into seconds and divides the total sum of the amounts of write by this value.

Next, the candidate object determination program 206 calculates the amount of data to be migrated in each pair group (S143). The candidate object determination program 206 calculates the amount of data to be migrated from a pair group from the total amount of write of the pair group and the data transfer capability of the resources allocated to the pair group.

The candidate object determination program 206 selects the pair groups one by one and determines the data transfer capability of each pair group. Specifically, the candidate object determination program 206 refers to the data transfer capability management table for ports 951 and calculates the total sum of the data transfer capabilities of the ports allocated to the selected pair group. The candidate object determination program 206 calculates the total sums of the data transfer capabilities of transmission ports and receiving ports separately.

Furthermore, the candidate object determination program 206 refers to the data transfer capability management table for processors 961 and calculates the total sum of the data transfer capabilities of the processors allocated to the selected pair group. The candidate object determination program 206 calculates the total sums of the data transfer capabilities of processors on the transmission side and processors on the receiving side separately.

The candidate object determination program 206 selects the lowest value among the total scans of the data transfer capabilities of the ports and the total sums of the data transfer capabilities of the processors as the data transfer capability of this pair group. The candidate object determination program 206 may employ other value, such as the average value of these, as the data transfer capability of the pair group.

The candidate object determination program 206 subtracts the foregoing value of the data transfer capability of the pair group from the total amount of write per unit time calculated for the pair group and determines the result to be the amount of data to be migrated for the pair group. The amount of data to be migrated represents the excess in the data to be transferred in copy processing of the pair group over the data transfer capability.

Next, the candidate object determination program 206 selects pair groups one by one and searches the write data amount management table 901 for primary volumes increasing in the amount of write data in each pair group (S144).

For example, the candidate object determination program 206 acquires the amounts of write to a primary volume from a predetermined number of recent entries of the write data amount management table 901 and applies the least-square using a linear function to determine the tendency of the change in the amount of write data.

If primary volumes increasing in the amount of write data exist (S145: YES), the candidate object determination program 206 creates a list of the volumes sorted in descending order of the increasing rate of write data (S146). If no volume increasing in the amount of write data exists, the candidate object determination program 206 includes all the primary volumes included in the pair group being processed in the list of volumes.

The candidate object determination 206 sorts the volumes in the created list based on the capacity of the primary volume (S147). The information on the capacities of primary volumes can be acquired from the primary volume management table 601.

The candidate object determination program 206 may sort only the primary volumes showing the same increasing rate in the list of primary volumes increasing in the amount of write data based on the capacity. Alternatively, the candidate object determination program 206 may divide the increasing rates of the amount of write data into a plurality of ranges and sort the primary volumes in each range based on the capacity. In this way, the increasing rate of the amount of write data is the first priority sort criterion and the capacity is the second priority sort criterion.

Preferentially selecting primary volumes increasing in the amount of write or primary volumes having smaller capacity leads to selecting volumes of lower cost and having more potential effect on future data transfer. The candidate object determination program 206 may select candidate volumes to be migrated with other selection criteria. For example, the candidate object determination program 206 may preferentially select primary volumes having a larger total amount of write data. Either only the amount of write data or the capacity may be employed as selection criterion.

The candidate object determination program 206 selects candidate volumes to be migrated in order from the top of the volume list so that the total amount of write data for the candidate volumes to be migrated will be the foregoing calculated amount of data to be migrated or more (S148). As a result, the delay in the source pair group can surely become lower than the threshold. It should be noted that the program 206 may be configured to select fewer candidate volumes. Next, the candidate object determination program 206 sends a list of candidate volumes to be migrated to the candidate destination determination program 207 (S149).

The list of candidate volumes to be migrated may include information on the copy groups in which the data transfer latencies are higher than the threshold. For example, the list of candidate volumes to be migrated indicates the candidate volumes in the foregoing sort order in each copy group and each pair group. The list of candidate volumes to be migrated may indicate the candidate volumes sorted independently from the pair group in each copy group.

The above-described example might select a pair group in the same storage apparatus pair that includes a candidate migration object as a candidate destination. Unlike this, the storage management server 180 may be configured to select candidate destinations from the pair groups in the storage apparatus pairs different from the storage apparatus pair including the candidate migration object. As a result, the data transfer latency in the source pair group and the source storage apparatus pair can surely be reduced.

FIG. 21 is a flowchart illustrating an example of the processing routine of the candidate destination determination program 207 included in the storage management program 187. The processing routine in FIG. 21 is started when the candidate object determination program 206 issues a list of candidate volumes to be migrated. The processing performed by the candidate destination determination program 207 in the description of FIG. 21 is actually performed by the CPU 181 that executes the storage management program 187. The candidate destination determination program 207 selects candidate destinations from the pair groups in the same copy group in the received volume list. As a result, consistency can be maintained between before and after pair migration.

The candidate destination determination program 207 receives a list of candidate volumes to be migrated from the candidate object determination program 206 (S151). The candidate destination determination program 207 performs Steps S152 to S154 on each primary volume in the list of candidate volumes to be migrated. The candidate destination determination program 207 selects the primary volumes in each copy group or pair group in sort order in the received list.

The candidate destination determination program 207 creates a list of pair groups sorted in descending order of the size of the margin in transfer capacity in the copy group to which the primary volume belongs (S152). The candidate destination determination program 207 calculates the margin in the transfer capacity by subtracting the total amount of write data from the data transfer capability of each pair group by the same method of Step S143 in the flowchart of FIG. 20. The pair groups having a negative value for the margin in the transfer capacity are excluded from the list.

Next, the candidate destination determination program 207 refers to the pair group-related resource management table 801 and narrows down the candidate destination pair groups based on the resources used by the pair group to which the primary volume belongs and the resources for the other pair groups (S153).

The candidate destination determination program 207 excludes the pair groups which have been allocated at least a part of the resources used by the pair group including the primary volume from the list of the foregoing pair group list. That is to say, it keeps only the pair groups which have been allocated resources completely different from the resources allocated to the pair group including the primary volume. As a result, migration of the asynchronous remote copy pair can surely and effectively reduce the load to the source pair group.

In another example, the candidate destination determination program 207 may exclude only the pair groups in which the resources used by the pair group including the primary volume are completely the same as the allocated resources from the list of the foregoing pair group list. Either the foregoing method or this method of narrowing down the candidates can attain the candidate destination pair groups using resources different from the resources of the pair group including the candidate volume to be migrated.

Next, candidate destination determination program 207 determines a candidate destination pair group for the asynchronous remote copy pair including the primary volume (S154). The candidate destination determination program 207 selects the pair group which has a margin in the transfer capacity more than the amount of write data for the primary volume and ranks at the top in the pair group list. As a result, data transfer delay in the destination can surely be eliminated. Depending on the design, the program 207 may select a pair group having a margin in the transfer capacity smaller than the amount of write data for the primary volume.

In the processing on each primary volume, the candidate destination determination program 207 uses the value obtained by subtracting the total amount of write data for the primary volume from the margin in the transfer capacity of the selected pair group. If the pair group list does not include any pair group having a margin in the transfer capacity equal to or more than the amount of write data for the primary volume, the primary volume is excluded from the candidate volumes to be migrated.

After performing Steps S152 to S154 on all the primary volumes (candidate volumes to be migrated), the candidate destination determination program 207 determines whether automatic migration has been set to the storage management program 187 (S155).

If automatic migration in the storage management program 187 is set at OFF (S155: OFF), the candidate destination determination program 207 sends the list of previously determined candidate volumes to be migrated and the candidate destination pair groups to the proposed migration display program 203 (S156).

If automatic migration in the storage management program 187 is set at ON (S155: ON), the candidate destination determination program 207 sends the list of the previously determined candidate volumes to be migrated and the candidate destination pair groups to the volume migration control program 204 (S157).

FIG. 22 is a flowchart illustrating an example of the processing routine of the proposed migration display program 203 included in the storage management program 187. The processing routine illustrated in FIG. 22 is started when the user displays a proposed migration list image 401 with the display device 103 of the storage management client 101. The processing performed by the proposed migration display program 203 in the description of FIG. 22 is actually performed by the CPU 181 that executes the storage management program 187.

The proposed migration display program 203 creates a proposed migration list image 401 including the latest list of the candidate volumes to be migrated (candidate asynchronous remote copy pairs to be migrated) and candidate destination pair groups received from the candidate destination determination program 207 (S161) and sends it to the storage management client 101 to be displayed on the display device 103 (S162). The proposed migration list image 401 has been described with reference to FIG. 6. Through this image, the user can check the information on migration.

When the user selects one or more desirable candidates for migration among the candidates for migration indicated in the proposed migration list image 401 by checking the corresponding check fields and then presses the MIGRATE button (S163: YES), the storage management client 101 sends the corresponding information to the proposed migration display program 203. The proposed migration display program 203 notifies the volume migration control program 204 of the information on the volumes to be migrated and the destination pair groups selected by the user (S154). Unless the MIGRATE button is pressed (S163: NO), the information is not sent to the volume migration control program 204.

FIG. 23 is a flowchart illustrating an example of the processing routine of the volume migration control program 204 included in the storage management program 187. The processing performed by the volume migration control program 204 in the description of FIG. 23 is actually performed by the CPU 181 that executes the storage management program 187.

If the automatic migration is set at ON in the storage migration program 187 (S171: ON), the volume migration control program 204 that has received information on the volumes to be migrated and the destination pair groups from the candidate destination determination program 207 (S172) instructs the relevant storage apparatus to perform migration of asynchronous remote copy pairs (S174).

If the automatic migration is set at OFF in the storage migration program 187 (S171; OFF), the volume migration control program 204 that has received information on the volumes to be migrated and the destination pair groups from the candidate destination display program 207 (S173) instructs the relevant storage apparatus to perform migration of asynchronous remote copy pairs (S174). Through this processing, asynchronous remote copy pairs can be appropriately migrated to reduce the delay in the asynchronous remote copy with low load to the user.

This invention is not limited to the above-described embodiment but includes various modifications. The above-described embodiment has been described in details for better understanding of this invention and is not limited to the one including all the configurations described above. A part of the configuration of one example may be replaced with that of another example; the configuration of one example may be incorporated to the configuration of another example. A part of the configuration of each example may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs for performing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A computer system comprising:
    an information storage system including one or more main storage apparatuses and one or more remote storage apparatuses,
    the information storage system including:
        a plurality of asynchronous remote copy pairs, the plurality of asynchronous remote copy pairs each consisting of a primary volume provided by the one or more main storage apparatuses and a secondary volume provided by the one or more remote storage apparatuses, the plurality of asynchronous remote copy pairs being divided into a plurality of pair groups each including one or more of the plurality of asynchronous remote copy pairs; and
        a plurality of copy groups each including corresponding pair groups;
    a management system configured to manage the information storage system by:
        using pair management information to manage relations between the plurality of pair groups and one or more asynchronous remote copy pairs included in the plurality of pair groups; and
        using resource management information to manage resources allocated to the plurality of pair groups to be used to transfer copy data in asynchronous remote copy,
    wherein the management system is configured to:
        monitor data transfer latencies in asynchronous remote copy in each of the plurality of copy groups;
        compare data transfer latencies of each copy group to a corresponding copy group threshold;
        determine one or more copy groups, having a copy group data transfer latency equal to or greater than each corresponding copy group threshold, as being one or more delayed copy groups;
        compare data transfer latencies of one or more pair groups in each delayed copy group to each corresponding copy group threshold;
        determine the one or more pair groups, having a pair group data transfer latency equal to or greater than each corresponding copy group threshold, as being one or more delayed pair groups;
        select, from the one or more delayed pair groups, a first asynchronous remote copy pair corresponding to a first pair group with reference to the pair management information; and
        select a second pair group having second allocated resources different from first resources allocated to the first pair group as a candidate migration destination of the first asynchronous remote copy pair with reference to the resource management information.

2. The computer system according to claim 1, wherein, in the resource management information, all the resources allocated to the second pair group selected by the management system are different from all the resources allocated to the first pair group.

3. The computer system according to claim 1, wherein the second pair group selected by the management system is provided by a main storage apparatus and a remote storage apparatus different from a main storage apparatus and a remote storage apparatus providing the first pair group.

4. The computer system according to claim 1, wherein one copy group of the plurality of copy groups includes the first pair group and the second pair group,
    the management system selects the second resources allocated to the second pair group from the one copy group that includes the first pair group, and wherein, in the one copy group, an order of update of primary volumes is consistent with an order of update of secondary volumes.

5. The computer system according to claim 1, wherein the first asynchronous remote copy pair is an asynchronous remote copy pair including a primary volume increasing in amount of write data per unit time in the first pair group.

6. The computer system according to claim 1, wherein the management system selects the first asynchronous remote copy pair based on capacities of primary volumes in the first pair group.

7. The computer system according to claim 1, wherein data transfer capability of the second pair group is higher than a total sum of amounts of write data for primary volumes in the second pair group and a primary volume of the first asynchronous remote copy pair.

8. The computer system according to claim 1, wherein the management system selects one or more asynchronous remote copy pairs including the first asynchronous remote copy pair from the first pair group as candidates for migration in such a manner that an amount of write data for the primary volumes in the first pair group will be equal to or less than data transfer capability of the first pair group.

9. The computer system according to claim 1, wherein the management system instructs the information storage system to migrate the first asynchronous remote copy pair.

10. The computer system according to claim 9, wherein the management system displays information of the first asynchronous remote copy pair and the second pair group on a display device and, in response to a user input to the displayed information, instructs the information storage system to migrate the first asynchronous remote copy pair.

11. The computer system according to claim 1, wherein monitoring the data transfer latencies in asynchronous remote copy in each of the plurality of copy groups further includes periodically acquiring received timestamps indicating the latest timestamp assigned to write data received by the one or more main storage apparatuses and reached timestamps indicating the latest timestamp assigned to write data received by the one or more remote storage apparatuses, and the management system is further configured to calculate the data transfer latencies of the one or more pair groups by subtracting a reached timestamp from a received timestamp.

12. The computer system according to claim 1, wherein the management system is further configured to calculate the data transfer latencies of each of the one or more copy groups by selecting the highest value among the data transfer latencies for each pair group in the one or more copy groups.

13. A method of managing, by a management system, an information storage system including one or more main storage apparatuses and one or more remote storage apparatuses, the information storage system including a plurality of asynchronous remote copy pairs, the plurality of asynchronous remote copy pairs each consisting of a primary volume provided by the one or more main storage apparatuses and a secondary volume provided by the one or more remote storage apparatuses, the plurality of asynchronous remote copy pairs being divided into a plurality of pair groups each including one or more of the plurality of asynchronous remote copy pairs, the information storage system also including a plurality of copy groups each having corresponding pair groups, the management system including:
- pair management information configured to manage relations between the plurality of pair groups and one or more asynchronous remote copy pairs included in the plurality of pair groups; and
- resource management information configured to manage resources allocated to the plurality of pair groups to be used to transfer copy data in asynchronous remote copy, the method comprising:
  - monitoring, by the management system, data transfer latencies in asynchronous remote copy in the plurality of copy groups;
  - comparing, by the management system, data transfer latencies of each copy group to a corresponding copy group threshold;
  - determining, by the management system, one or more copy groups, having a copy group data transfer latency equal to or greater than each corresponding copy group threshold, as being one or more delayed copy groups;
  - comparing, by the management system, data transfer latencies of one or more pair groups in each delayed copy group to each corresponding copy group threshold;
  - determining, by the management system, the one or more pair groups, having a pair group data transfer latency equal to or greater than each corresponding copy group threshold, as being one or more delayed pair groups;
  - selecting, by the management system, from the one or more delayed pair groups, a first asynchronous remote copy pair corresponding to a first pair group of the plurality of pair groups with reference to the pair management information; and
  - selecting, by the management system, a second pair group having second allocated resources different from first resources allocated to the first pair group as a candidate migration destination of the first asynchronous remote copy pair with reference to the resource management information.

14. An article of manufacture for managing an information storage system including one or more main storage apparatuses and one or more remote storage apparatuses, and a plurality of asynchronous remote copy pairs, the plurality of asynchronous remote copy pairs each consisting of a primary volume provided by the one or more main storage apparatuses and a secondary volume provided by the one or more remote storage apparatuses, the plurality of asynchronous remote copy pairs being divided into a plurality of pair groups each including one or more of the plurality of asynchronous remote copy pairs, the information storage system also including a plurality of copy groups each having corresponding pair groups, the article of manufacture comprising a non-transitory, tangible computer-readable medium holding computer-executable instructions for performing a method comprising:
- managing relations between the plurality of pair groups and one or more asynchronous remote copy pairs included in the plurality of pair groups;
- managing resources allocated to the plurality of pair groups to be used to transfer copy data in asynchronous remote copy;
- monitoring data transfer latencies in asynchronous remote copy in the plurality of copy groups;
- comparing, by a management system, data transfer latencies of each copy group to a corresponding copy group threshold;
- determining, by the management system, one or more copy groups, having a copy group data transfer latency equal to or greater than each corresponding copy group threshold, as being one or more delayed copy groups;
- comparing, by the management system, data transfer latencies of one or more pair groups in each delayed copy group to each corresponding copy group threshold;
- determining, by the management system, the one or more pair groups, having a pair group data transfer latency equal to or greater than each corresponding copy group threshold, as being one or more delayed pair groups;
- selecting from the one or more delayed pair groups, a first asynchronous remote copy pair corresponding to a first pair group with reference to pair management information; and
- selecting a second pair group having second allocated resources different from first resources allocated to the first pair group as a candidate migration destination of the first asynchronous remote copy pair with reference to resource management information.

* * * * *